(12) United States Patent
Firminger et al.

(10) Patent No.: US 8,260,807 B2
(45) Date of Patent: *Sep. 4, 2012

(54) IDENTIFICATION AND PROVISION OF REPORTED ASPECTS THAT ARE RELEVANT WITH RESPECT TO ACHIEVEMENT OF TARGET OUTCOMES

(75) Inventors: Shawn P. Firminger, Redmond, WA (US); Jason Garms, Redmond, WA (US); Roderick A. Hyde, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/592,544

(22) Filed: Nov. 24, 2009

(65) Prior Publication Data

US 2011/0055269 A1 Mar. 3, 2011

Related U.S. Application Data

(63) Continuation-in-part of application No. 12/592,161, filed on Nov. 18, 2009, and a continuation-in-part of application No. 12/592,075, filed on Nov. 17, 2009, and a continuation-in-part of application No. 12/590,841, filed on Nov. 12, 2009, and a continuation-in-part of application No. 12/590,600, filed on Nov. 10, 2009, and a continuation-in-part of application No. 12/590,039, filed on Oct. 30, 2009, and a continuation-in-part of application No. 12/590,027, filed on Oct. 29, 2009, and a continuation-in-part of application No. 12/587,127, filed on Sep. 30, 2009, and a continuation-in-part of application No. 12/587,018, filed on Sep. 29, 2009, and a continuation-in-part of application No. 12/584,653, filed on Sep. 8, 2009, and a continuation-in-part of application No. 12/584,489, filed on Sep. 3, 2009.

(51) Int. Cl.
*G06F 17/30* (2006.01)
(52) U.S. Cl. ........ 707/770; 707/758; 709/203; 709/219; 600/301
(58) Field of Classification Search ............. 707/999.01, 707/999.003, 999.006, 999.107, 758, 770, 707/E17.107; 709/203, 217–219; 600/301
See application file for complete search history.

(56) References Cited

U.S. PATENT DOCUMENTS 4,853,854 A 8/1989 Behar et al.

(Continued)

OTHER PUBLICATIONS

Gaonkar et al., Micro-Blog: Sharing and Querying Content Through Mobil Phones and Social Participation, Jun. 20, 2008, ACM, pp. 174-186.*

(Continued)

*Primary Examiner* — Leslie Wong

(57) ABSTRACT

A computationally implemented method includes, but is not limited to: identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes; and providing the one or more relevant reported aspects. In addition to the foregoing, other method aspects are described in the claims, drawings, and text forming a part of the present disclosure.

32 Claims, 16 Drawing Sheets

U.S. PATENT DOCUMENTS

| | | | |
|---|---|---|---|
| 5,961,446 | A | 10/1999 | Beller et al. |
| 6,338,044 | B1 | 1/2002 | Cook et al. |
| 6,353,447 | B1 | 3/2002 | Truluck et al. |
| 6,842,604 | B1 | 1/2005 | Cook et al. |
| 7,587,368 | B2 * | 9/2009 | Felsher ........................... 705/65 |
| 7,668,735 | B2 * | 2/2010 | Grace et al. ...................... 705/2 |
| 7,702,685 | B2 | 4/2010 | Shrufi et al. |
| 7,860,852 | B2 * | 12/2010 | Brunner et al. ............... 707/706 |
| 7,908,182 | B1 * | 3/2011 | Gupta .......................... 705/26.7 |
| 7,959,567 | B2 * | 6/2011 | Stivoric et al. ................. 600/300 |
| 8,005,906 | B2 * | 8/2011 | Hayashi et al. ............... 709/206 |
| 2002/0107707 | A1 | 8/2002 | Naparstek et al. |
| 2004/0015337 | A1 | 1/2004 | Thomas et al. |
| 2005/0197553 | A1 | 9/2005 | Cooper |
| 2005/0216300 | A1 | 9/2005 | Appelman et al. |
| 2006/0036619 | A1 | 2/2006 | Fuerst et al. |
| 2007/0088576 | A1 | 4/2007 | de Beus et al. |
| 2008/0091471 | A1 * | 4/2008 | Michon et al. .................... 705/3 |
| 2008/0288425 | A1 | 11/2008 | Posse et al. |
| 2008/0294012 | A1 | 11/2008 | Kurtz et al. |
| 2009/0044113 | A1 | 2/2009 | Jones et al. |
| 2009/0070679 | A1 | 3/2009 | Shen et al. |
| 2009/0075242 | A1 | 3/2009 | Schwarzberg et al. |
| 2009/0076335 | A1 | 3/2009 | Schwarzberg et al. |
| 2009/0100469 | A1 | 4/2009 | Conradt et al. |
| 2009/0176526 | A1 | 7/2009 | Altman |
| 2009/0258710 | A1 | 10/2009 | Quatrochi et al. |
| 2009/0271247 | A1 | 10/2009 | Karelin et al. |
| 2009/0292814 | A1 | 11/2009 | Ting et al. |
| 2009/0299990 | A1 | 12/2009 | Setlur et al. |
| 2009/0313041 | A1 | 12/2009 | Eder |
| 2009/0319288 | A1 | 12/2009 | Slaney et al. |
| 2009/0326981 | A1 | 12/2009 | Karkanias et al. |
| 2010/0063993 | A1 | 3/2010 | Higgins et al. |
| 2010/0114788 | A1 | 5/2010 | White et al. |
| 2010/0268830 | A1 | 10/2010 | McKee et al. |
| 2010/0281364 | A1 | 11/2010 | Sidman |
| 2010/0293247 | A1 | 11/2010 | McKee et al. |
| 2010/0305806 | A1 | 12/2010 | Hawley |
| 2011/0022602 | A1 | 1/2011 | Luo et al. |
| 2011/0179161 | A1 | 7/2011 | Guy et al. |
| 2011/0185020 | A1 | 7/2011 | Ramamurthy et al. |
| 2011/0252101 | A1 | 10/2011 | Davis et al. |

OTHER PUBLICATIONS

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

"Self-tracking links to get you started"; The Quantified Self: self knowledge through numbers; printed on Dec. 10, 2010; pp. 1-5; located at: http://quantifiedself.com/self-tracking-links-to-get-you-started/.

U.S. Appl. No. 12/655,582, Firminger et al.
U.S. Appl. No. 12/655,581, Firminger et al.
U.S. Appl. No. 12/655,365, Firminger et al.
U.S. Appl. No. 12/655,250, Firminger et al.
U.S. Appl. No. 12/655,075, Firminger et al.
U.S. Appl. No. 12/653,972, Firminger et al.
U.S. Appl. No. 12/653,387, Firminger et al.
U.S. Appl. No. 12/653,386, Firminger et al.
U.S. Appl. No. 12/653,180, Firminger et al.
U.S. Appl. No. 12/653,117, Firminger et al.
U.S. Appl. No. 12/592,946, Firminger et al.
U.S. Appl. No. 12/592,944, Firminger et al.
U.S. Appl. No. 12/592,548, Firminger et al.
U.S. Appl. No. 12/592,161, Firminger et al.
U.S. Appl. No. 12/592,075, Firminger et al.
U.S. Appl. No. 12/590,841, Firminger et al.
U.S. Appl. No. 12/590,600, Firminger et al.
U.S. Appl. No. 12/590,039, Firminger et al.
U.S. Appl. No. 12/590,027, Firminger et al.
U.S. Appl. No. 12/587,127, Firminger et al.
U.S. Appl. No. 12/587,018, Firminger et al.
U.S. Appl. No. 12/584,653, Firminger et al.
U.S. Appl. No. 12/584,489, Firminger et al.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-remembered-as-the...; printed on Nov. 25, 2009.

"Exercise Pro Software Active Care Version 5"; BioEX Systems, Inc.; bearing dates of 1995-2009; pp. 1-4; located at http://www.bioexsystems.com/ActiveCare.htm; printed on Dec. 17, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx!125919...; printed on Nov. 25, 2009.

Guez, Tomer; "Weight Loss Software, Food Diary, Exercise Tracker, and Medical Diary. 'The Food and Exercise Diary Software Version 6.0'"; bearing a date of Sep. 2009; pp. 1-17; located at http://www.weightlosssoftware.com/?ti=135&wn=2; printed on Dec. 17, 2009.

"Nutrition tracking software is critical for learning about foods and planning meals"; NutriCoach; bearing a date of Mar. 29, 2006; 6 total pgs.; located at http://www.nutricoach.net/diet_software.html; printed on Dec. 17, 2009.

"Nutritionmaker Focus Nutrition Software Motivate—Analyze—Instruct"; BioEX Systems, Inc.; bearing dates of 1995-2009; pp. 1-4; located at http://www.bioexsystems.com/NutritionMakerChiro.htm; printed on Dec. 17, 2009.

"Tired of a stiff neck and shoulders? Ergo Pro Computer Fatigue Software reminds you when to stretch and shows you how"; BioEX Systems, Inc.; bearing dates of 1995-2009; pp. 1-3; located at hitp://www.bioexsystems.com/ExerciseBreak.htm; printed on Dec. 17, 2009.

"VHI PC-Kits Desktop Edition"; Visual Health Information; pp. 1-2; located at http://www.vhikits.com/products/software/PCKitsDesktop.aspx; printed on Dec. 17, 2009.

Chen, Jason; "You Can Soon Track Your Heart Rate with Your iPhone"; Gizmodo; Bearing a date of Oct. 9, 2009; p. 1; Creative Commons License; located at: http://gizmodo.com/5378340/you-can-soon-track-your-heart-rate-with-your-iphone; printed on Oct. 29, 2009.

"Fitbit"; Bearing a date of 2009; pp. 1-2; Fitbit, Inc., located at: http://www.fitbit.com; printed on Oct. 29, 2009.

"Free Exercise Programs—Workout Routines & Weight Loss Diet Plans"; Freetrainers.com; Bearing dates of 2000-2008; pp. 1-2; located at: http://www.freetrainers.com/FT/jsp/index.jsp; printed on Sep. 2, 2009.

Wilson, Mark; "Philips DirectLife Turns Exercise Into a Status Bar"; Gizmodo; Bearing a date of Oct. 21, 2009; pp. 1-2; Creative Commons License; located at: http://gizmodo.com/5386577/philips-directlife-turns-exercise-into-a-status-bar; printed on Oct. 29, 2009.

"Your Personalized Development Plan"; Central Michigan University; Bearing a date of 2004; p. 1; located at: http://www.chsbs.cmich.edu/leader_model/dplanintro.htm; printed on Sep. 2, 2009.

* cited by examiner

IDENTIFICATION AND PROVISION OF REPORTED ASPECTS THAT ARE RELEVANT WITH RESPECT TO ACHIEVEMENT OF TARGET OUTCOMES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/584,489, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/584,653, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 8 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,018, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,127, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,027, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,039, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,600, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 10 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,841, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 12 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,075, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T.

Tegreene; Kristin M. Tolle; Lowell L. Wood, Jr. as inventors, filed 17 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,161, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 18 Nov. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes; and providing the one or more relevant reported aspects. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes; and means for providing the one or more relevant reported aspects. In addition to the foregoing, other system aspects are described in the claims, drawings, and text forming a part of the present disclosure.

A computationally implemented system includes, but is not limited to: circuitry for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes; and circuitry for providing the one or more relevant reported aspects. In addition to the foregoing, other system aspects are described in the claims, drawings, and text forming a part of the present disclosure.

A computer program product including a signal-bearing medium bearing one or more instructions for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes; and one or more instructions for providing the one or more relevant reported aspects. In addition to the foregoing, other computer program product aspects are described in the claims, drawings, and text forming a part of the present disclosure.

A method for providing relevant reported aspects that are relevant to achieving one or more target outcomes, the method includes identifying, using a processor one or more relevant reported aspects associated with one or more source users that are relevant to achieving one or more target outcomes, the identification of the one or more relevant reported aspects in response to reception of one or more solicitations and being based, at least in part, on relevancy of the one or more relevant reported aspects with respect to achieving the one or more target outcomes; and providing the one or more relevant reported aspects.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
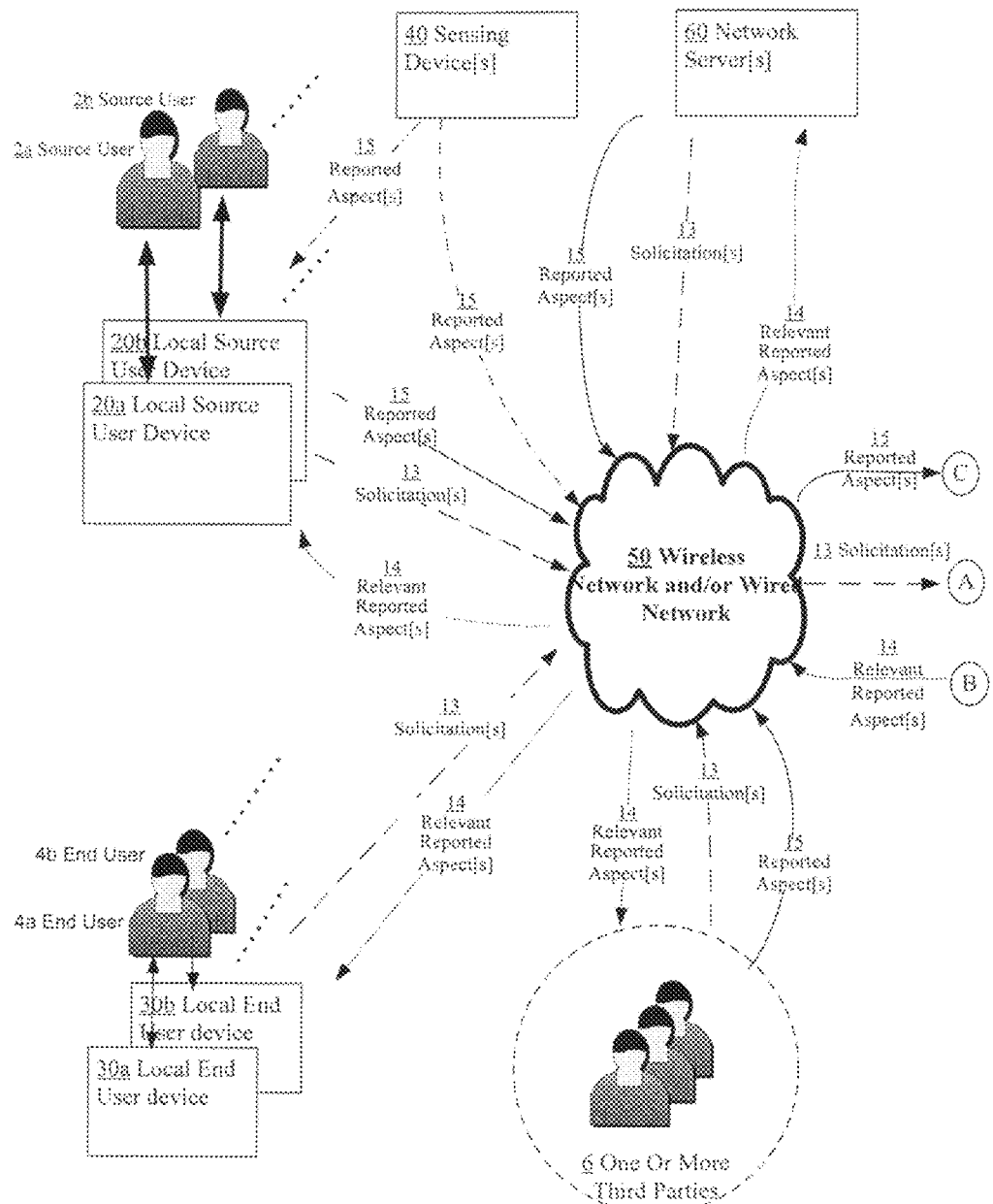
FIGS. 1a and 1b show a high-level block diagram of a Computing Device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that has enjoyed explosive popularity in the computing/communication field is to electronically record one's daily activities, behaviors, thoughts, beliefs, traits, physical or mental states, physical characteristics, and other aspects of the person's everyday life onto an open journal. One place where such open journals are maintained is at social networking sites commonly known as "blogs" where one or more users may report or post every aspect of their daily lives. In brief, an "aspect," as will be referred to herein, may be in reference to any act, behavior, characteristic, user state or status, belief, and so forth, that may be associated with a user (e.g., a person including, for example, a network user such as a blogger or a social networking user). The process of reporting or posting blog entries is commonly referred to as "blogging." A newer type of blogging that has become very popular in recent times is microblogging, otherwise known as "twittering" or "tweeting." In microblogging, each of the microblogs that are posted are typically relatively short posts or entries, usually not more than 140 characters long.

Other types of social networking sites may also allow users to maintain open journals and to allow users to easily update their personal information in real time. Such updates are typically made via, for example, social networking status reports otherwise known simply as "status reports." These social networking sites allow a user to report or post for others to view the latest status or other aspects related to the user.

Another recent tread in social networking is to employ one or more sensors to detect and report on a wide variety of user aspects (i.e., aspects of a user). Examples of sensors that may be used for such purposes vary widely, ranging from well-known devices that can detect and report on various physiological parameters such as heart rate or blood pressure, to sensors that can detect certain user behaviors or activities such as toilet usage. Although a wealth of personal information provided through log entries (e.g., microblogs, status reports, sensor data, and so forth) are now available through these social networking sites, it is only recently has there been any effort to exploit such potentially useful data. As blogs, microblogs, and various social networking sites become increasingly popular, personal data collected through such means may be spread across multiple network sites making it even more difficult to exploit such potentially useful data.

In various embodiments, methods, systems, circuitry, and computer program products are provided for providing one or more reported aspects of one or more users that are relevant for achieving one or more target outcomes. More particularly, the methods, systems, circuitry, and computer program products may be designed to identify selectively, in response to reception of one or more solicitations, one or more relevant reported aspects associated with one or more "source users" that are relevant to achieving one or more target outcomes, the selective identification of the one or more relevant reported aspects being based, at least in part, on relevancy of the one or more relevant reported aspects with respect to achieving the one or more target outcomes.

Based on the identification of the one or more relevant reported aspects, the one or more identified relevant reported aspects may then be provided. In some cases, the providing of the one or more relevant reported aspects may involve transmission of, displaying of, allowing access to, and/or distribution of such data to one or more computing/communication devices such as network devices. In various embodiments, the methods, systems, circuitry, and computer program products may be implemented by a variety of computing/communication devices including, for example, a network device such as a server (e.g., network servers) or a local client device.

In various embodiments, the one or more relevant reported aspects that are provided by the methods, systems, circuitry, and computer program products may be used directly by an end user in order to achieve the one or more target outcomes when the one or more relevant reported aspects are emulated by the end user. Alternatively, the one or more relevant reported aspects that are provided may be used in order to develop one or more templates and/or one or more personalized plans, which may then be used by an end user in order to achieve the one or more target outcomes. A "template" is a generic plan designed to facilitate the achievement of one or more target outcomes when one or more emulatable aspects included in the template are emulated. The one or more emulatable aspects that may be included in the template may correspond to the one or more relevant reported aspects that were provided and that are relevant for achieving the one or more target outcomes.

In contrast, a "personalized plan" may merely be a template that has personalized for a particular end user. For example, by taking a generic template and modifying the generic template (e.g., modifying or replacing the emulatable aspects that may be included in the generic template) such that the modified generic template (e.g., personalized plan) meets or satisfies logistical or physical limitations of the end user. An example of a personalized plan (or a template) is a personalized plan (or a template) that was developed based on relevant reported aspects of a source user that facilitates an end user to achieve a desired outcome such as weight loss or getting a high score on the scholastic aptitude test (SAT).

Such a personalized plan (or template) may be embodied by a schedule of activities (e.g., emulatable aspects) that an end user may need to emulate in order to achieve the target outcome. For example, if the personalized plan is designed to facilitate an end user to lose weight, it may include a schedule of when and what activities (e.g., go jogging for 30 minutes on day 1, go swimming for 40 minutes on day 2, and so forth) the end user may need to execute in order to achieve the weight loss. Similarly, if the personalized plan is designed to facilitate an end user to achieve a high score for the SAT, the personalized plan may be a schedule of when and what activities (e.g., read a particular book on day 1, work on math problems from a particular math book on day 2, and so forth) the end user may need to execute in order to achieve the high test score for the SAT.

In order to facilitate understanding of the various concepts to be described herein, an introduction to the meaning of certain words and phrases to be used in the following discussion is now provided. In brief, and as will be further described herein, an "aspect" may be any occurrence of any behavior, act, belief, characteristic, state, or any other facet associated with a source user or a group of source users. A "source user" may be any person, such as a microblogger, who may be the basis for one or more reported aspects. Note that a source user may not necessarily have to be the source for the one or more reported aspects that are related to the source user since reported aspects that are associated with a particular source user may be provided by other source users or by sensing devices. Note that in some cases, a template or a personalized plan does not have to be a schedule of activities, but may merely be a collection of one or more emulatable aspects. For example, a template may be developed (based on relevant reported aspects) for achieving lower blood pressure that may indicate a single emulatable aspect (e.g., be spiritual or religious all the time).

A "reported aspect" may be any aspect associated with a source user that has been reported by various means (e.g., microblog entries, status reports, sensing device entries, and so forth). A "relevant reported aspect" is a reported aspect that is relevant to achieving one or more target outcomes (e.g., sought-after goals or desired outcomes). In some embodiments, what constitutes "relevant" with respect to achieving one or more target outcomes may depend on one or more "relevancy factors" that may be considered in determining, for example, whether a reported aspect is relevant to achieving one or more target outcomes as will be further described herein. Note that references in the following to "reported aspects" and "relevant reported aspects" will actually be in reference to data that indicate such information (e.g., data that indicate reported aspects and data that indicate relevant reported aspects) unless indicated otherwise.

In some embodiments, a reported aspect may have been originally reported via log entry such as a blog or microblog entry, a status report, a journal entry, a sensing device entry, or other types of entry. Such a log entry may be provided by the source user that the reported aspect is associated with, by another source user, by a third party (e.g., network service provider), or by a sensing device that can detect the aspect being reported.

A "target outcome" may be any type of desirable goal or result that may be sought by, for example, an end user. Examples of target outcomes include, for example, health-related outcomes such as weight loss or improved cardiovascular conditioning, athletic outcomes such as developing a particular athletic skill including being able to pitch a curve ball or achieving a particular golf handicap, physiological outcomes such as reduced blood pressure or blood glucose levels, social outcomes such as obtaining membership into an elite social club or attaining a particular social status, mental state outcomes such as achieving certain level of calmness or happiness, interpersonal or relational outcomes such as having lots of friends or developing skill to make friends, employment outcomes such as being promoted or developing certain work skills, academic or intellectual outcomes, and so forth.

An "end user" may be any person who is a direct or indirect beneficiary of one or more relevant reported aspects that may be provided and that are relevant to achieving one or more target outcomes. In some cases, an end user may be a direct beneficiary of the one or more relevant reported aspects by, for example, directly using (e.g., emulating) the one or more relevant reported aspects in order to achieve the one or more target outcomes. Alternatively, an end user may be an indirect beneficiary of the one or more relevant reported aspects by being the beneficiary of a template or a personalized plan developed based on the one or more relevant reported aspects.

As briefly described above, a "source user" may be any person who may be the basis for one or more reported aspects. Note that although in most cases, a source user will be an actual (real) person who may be the basis for one or more reported aspects, in other cases, however, a source user may be a fictional person such as a composite of multiple "actual" source users. For example, reported aspects indicating actual aspects of a plurality of actual source users may be compiled and processed (e.g., normalized or averaged out) in order to create a fictional source user.

Figure 1B:
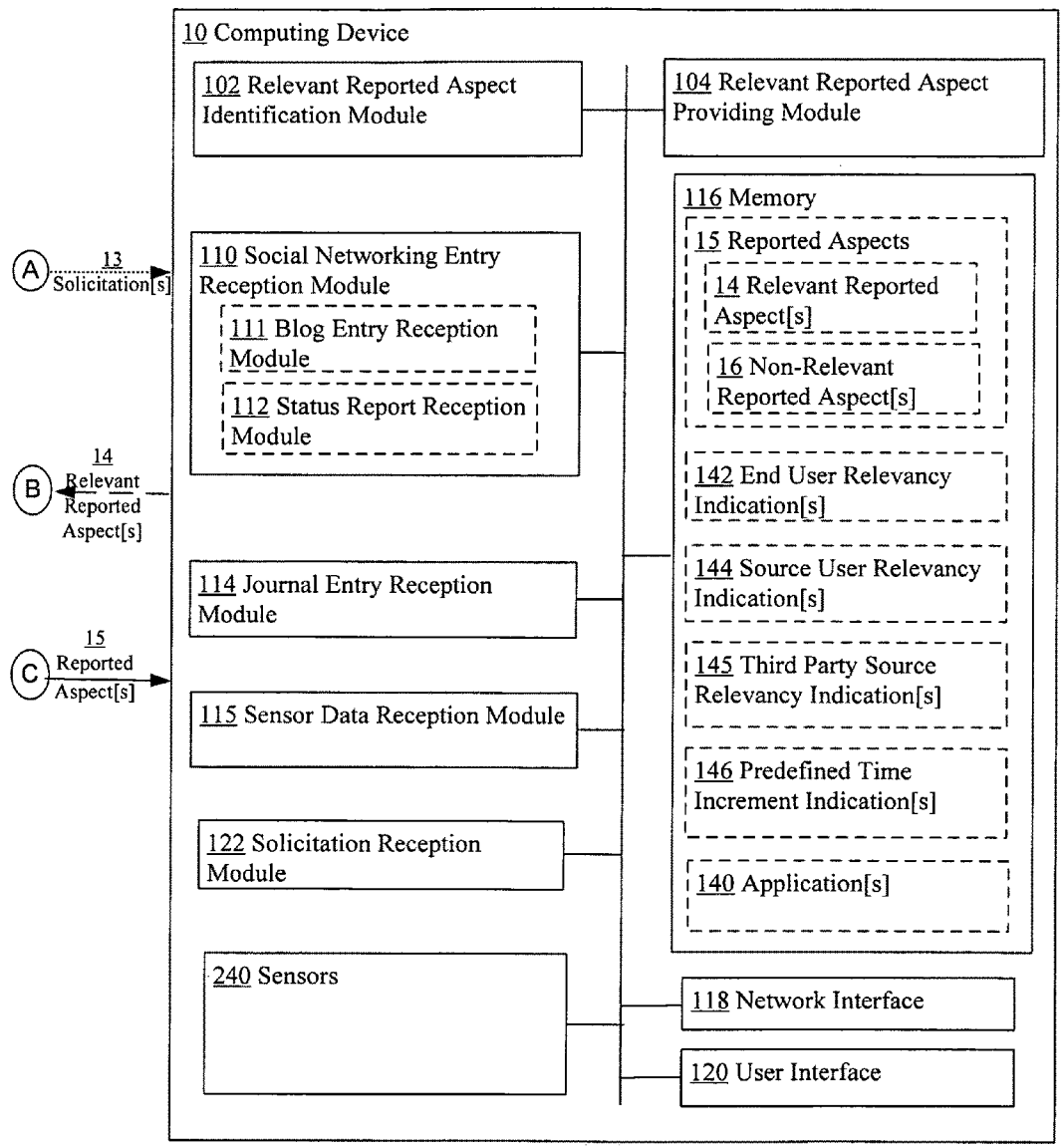

Turning now to FIGS. 1a, and 1b illustrating an example environment 100 in which the methods, systems, circuitry, and computer program products in accordance with various embodiments may be implemented by a computing device 10. In particular, the methods, systems, circuitry, and computer program products may be implemented at any network device including at a peer-to-peer network component device. In various embodiments, the computing device 10 may be a server such as one of the one or more network servers 60 illustrated in FIG. 1a. Alternatively, the computing device 10 may be a source user device such as one of the local source user devices 20* illustrated in FIG. 1a. In still other embodiments, the computing device 10 may be an end user device such as one of the local end user device 30* illustrated in FIG. 1a. Note that in the following, "*" represents a wildcard. Thus, references in the following description to, for example, "a source user 2*" may be in reference to a source user 2a, a source user 2b, and so forth.

Note that for ease of understanding and explanation, the computing device 10 of the exemplary environment 100 of FIGS. 1a and 1b will be generally described in the following discussion as being a server (e.g., server embodiment) rather than an end user device or a source user device. Further, although the following discussion related to the exemplary environment 100 of FIG. 1a and 1b assumes that the computing device 10 is a server, the following discussion will, for the most part, be applicable even if the computing device 10 were an end user device (e.g., local end user device 30*) or a source user device (e.g., local source user device 20*) with certain obvious exceptions (e.g., if the computing device 10 is an end user device or a source user device rather than a server, the computing device 10 may communicate with an end user 4 or a source user 2* directly through a user interface 120 rather than indirectly through a wireless network and/or wired network 50 as may be the case when the computing device 10 is a server). In some embodiments, the computing device 10 may operate via a web 1.0 or web 2.0 construct.

Referring back to FIGS. 1*a* and 1*b*, and as previously indicated, the computing device 10 may be a network device such as a server (e.g., network server 60) that is designed to communicate with other network devices. For example, the computing device 10 may communicate with one or more source users 2*(e.g., source user 2*a*, source user 2*b*, and so forth) through one or more local source user devices 20*(e.g., local source user device 20*a*, local source user device 20*b*, and so forth), with one or more end users 4*(e.g., end user 4*a*, end user 4*b*, and so forth) through one or more local end user devices 30*(e.g., local end user device 30*a*, local end user device 30*b*, and so forth), with one or more sensing devices 40, with one or more network servers 60, and/or with one or more third parties 6 (e.g., one or more content providers, one or more network service providers, and/or one or more other parties) via a wireless network and/or wired network 50. In various implementations, the wireless and/or wired network 50 may include at least one of a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wireless and/or wired networks 50.

In various embodiments, the computing device 10 may be designed to, among other things, identify (e.g., selectively identify, locate, find, search, distinguish, and so forth) one or more relevant reported aspects 14 associated with one or more source users 2* that are relevant to achieving one or more target outcomes, the identification of the one or more relevant reported aspects 14 being based, at least in part, on relevancy of the one or more relevant reported aspects 14 with respect to achieving the one or more target outcomes. The identification of the one or more relevant reported aspects 14 may, in some cases, be in response to reception of one or more solicitations 13 from one or more end users 4*(e.g., via one or more local end user devices 30*), from one or more source users 2*(e.g., via one or more local source user devices 20*), from one or more network servers 60, or from other parties (e.g., one or more third parties 6). Note that in embodiments where the computing device 10 is an end user device or a source user device, the one or more solicitations 13 may be directly received from an end user 4* or a source user 2* via a user interface 120.

In various embodiments, the identification of the one or more relevant reported aspects 14 may be by identifying the one or more relevant reported aspects 14 from a plurality of reported aspects 15, which may, in some embodiments, be stored in memory 116. The plurality of reported aspects 15 may include both relevant reported aspects 14 that are relevant to achieving one or more target outcomes, and non-relevant reported aspects 16 that are not relevant to achieving the one or more target outcomes. In some implementations, the plurality of reported aspects 15 may be associated with a single source user 2*. In other implementations, however, the plurality of reported aspects 15 may be associated with a plurality of source users 2*.

The plurality of reported aspects 15, which may be associated with one or more source users 2*, may be acquired from a variety of different sources. For example, in some implementations, one or more of the plurality of reported aspects 15 may be acquired from one or more local source user devices 20*, from one or more network servers 60, from one or more sensing devices 40, and/or one or more third parties 6.

Note that in embodiments where the computing device 10 is a source user device, one or more of the plurality of reported aspects 15 may be acquired directly from one or more sensing devices 40 or directly from a source user 2* via a user interface 120. Further, in embodiments where the computing device 10 is a source user device, the computing device 10 may include one or more integrated sensors 240 that may be employed in order to directly sense or detect one or more aspects associated with a source user 2*. As will be further described, a sensor 240 may be any type of sensor including, for example, sensors that can sense various physical characteristics of a source user 2* (e.g., heart rate sensor or blood pressure sensor), sensors that can sense activities of a source user 2*(e.g., a pedometer), sensors that can sense environment conditions (e.g., air quality sensors), sensors that can sense the location of a source user 2*(e.g., global positioning system or GPS), and so forth.

In any event, after identifying the one or more relevant reported aspects 14, the computing device 10, may be configured to, among other things, provide the one or more relevant reported aspects 14 to one or more entities. In this context, the providing of the one or more relevant reported aspects 14 may involve transmitting, via the wireless network and/or the wired network 50, the one or more relevant reported aspects 14 to one or more network entities such as local source user devices 20*, network servers 60, local end user devices 30*, and/or third parties 6. The one or more relevant reported aspects 14 may also be provided by displaying or indicating the one or more relevant reported aspects 14 through a user interface 120 (e.g., a display monitor and/or speakers) in embodiments where, for example, the computing device 10 is a source user device or an end user device.

As briefly described earlier, in some implementations, the operation to identify the one or more relevant reported aspects 14 by the computing device 10 may be in response to the computing device 10 receiving, via the wireless network and/or the wired network 50, one or more solicitations 13 from, for example, one or more end users 4* (e.g., via one or more local end user devices 30*), from one or more source users 2*(e.g., via one or more local source user devices 20*), from one or more network servers 60, or from one or more third parties 6 (e.g., a network service provider, a content provider, and so forth). The one or more solicitations 13 may be, in various implementations, one or more requests, queries, and so forth. In some embodiments, the one or more solicitations 13 may indicate at least one or more target outcomes. In other embodiments, however, the one or more solicitations 13 may indicate one or more source users 2* who have achieved the one or more target outcomes. In embodiments where the computing device 10 is a source user device or an end user device, the one or more solicitations 13 may be received through the user interface 120.

The computing device 10 as previously indicated may be a server (e.g., one of the one or more network servers 60) that may be located at a single network site, located across multiple network sites, or may be a conglomeration of servers located at multiple network sites. In embodiments in which the computing device 10 is a source user device (e.g., local source user device 20*) or an end user device (e.g., local end user device 30*) rather than a network server, the computing device 10 may be any one of a wide range of mobile or stationary computing/communication devices including, for example, a laptop, a desktop, a workstation, a cellular telephone, a personal digital assistant (PDA), a Smartphone, a web tablet such as a Netbook, and so forth.

With respect to the one or more sensing devices 40 of the exemplary environment 100 of FIGS. 1*a* and 1*b*, the one or more sensing devices 40 may communicate with the wireless network and/or the wired network 50 directly or indirectly via the one or more local source user devices 20*. As will be further described herein with respect to FIG. 2c, each of the one or more sensing devices 40 (see FIG. 2c) may include one or more sensors 240, a network interface 242, and/or a memory 244. The one or more sensors 240 may be designed to detect or sense one or more aspects associated with one or more source users 2*.

Examples of sensors 240 include, for example, devices that can detect physical or physiological characteristics of one or more source users 2*, devices that can detect activities of the one or more source users 2*, devices that can detect external events (e.g., environmental conditions including the weather, pollution levels, performance of the stock market, and so forth), image capturing device such as a digital camera or camcorder, and/or devices that can detect the location of the one or more source users 2* such as a global positioning system or GPS. Examples of devices that can detect physical or physiological characteristics include, for example, a heart rate monitor, a blood pressure sensor, a glucose sensor, and so forth. Examples of devices that can detect activities of the one or more source users 2* including, for example, a pedometer, a toilet monitoring system (e.g., to monitor bowel movements), exercise machine sensors, an accelerometer to measure a person's movements which may indicate specific activities, and so forth.

Each of the one or more local source user devices 20* and each of the one or more local end user devices 30*(as well as the computing device 10 in embodiments in which the computing device 10 is an end user device or a source user device) may be any one of a variety of computing/communication devices including, for example, a cellular phone, a personal digital assistant (PDA), a laptop, a desktop, or other types of computing/communication devices. In some embodiments, the one or more local source user devices 20* and/or the one or more local end user devices 30*(as well as the computing device 10 in some embodiments) may be a handheld device such as a cellular telephone, a Smartphone, a Mobile Internet Device (MID), an Ultra Mobile Personal Computer (UMPC), a convergent device such as a personal digital assistant (PDA), and so forth. Alternatively, such local client devices (e.g., local source user device 20* and/or local end user device 30*) may be a laptop, a desktop, a workstation, a web tablet such as a Netbook, or other types of devices that may not be a handheld device in various alternative implementations.

Figure 2A:
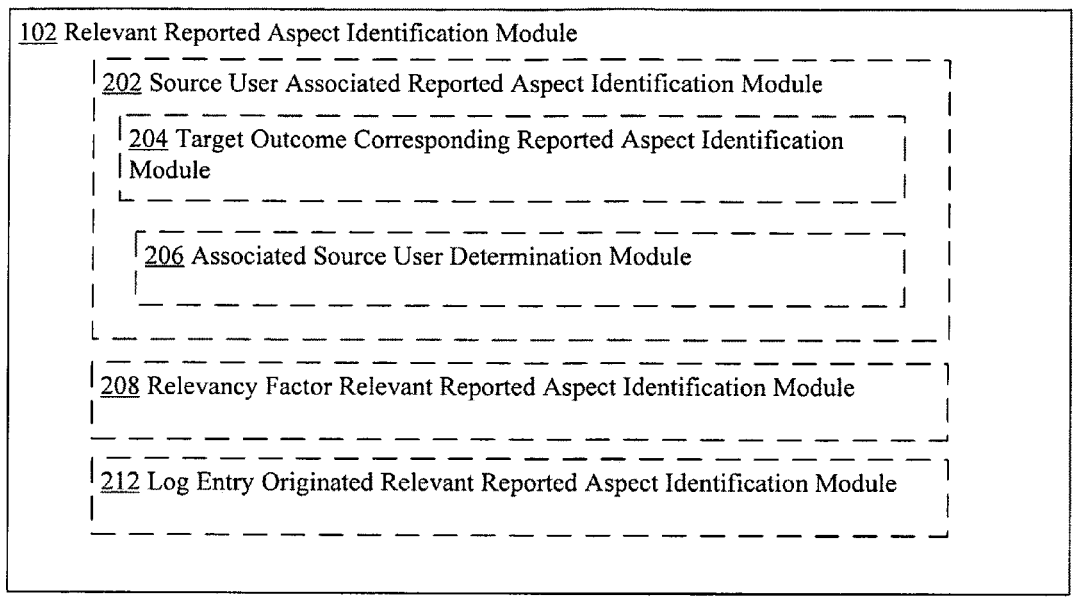
FIG. 2a shows another perspective of the Relevant Reported Aspect Identification Module 102 of the Computing Device 10 of FIG. 1b.
Figure 2B:
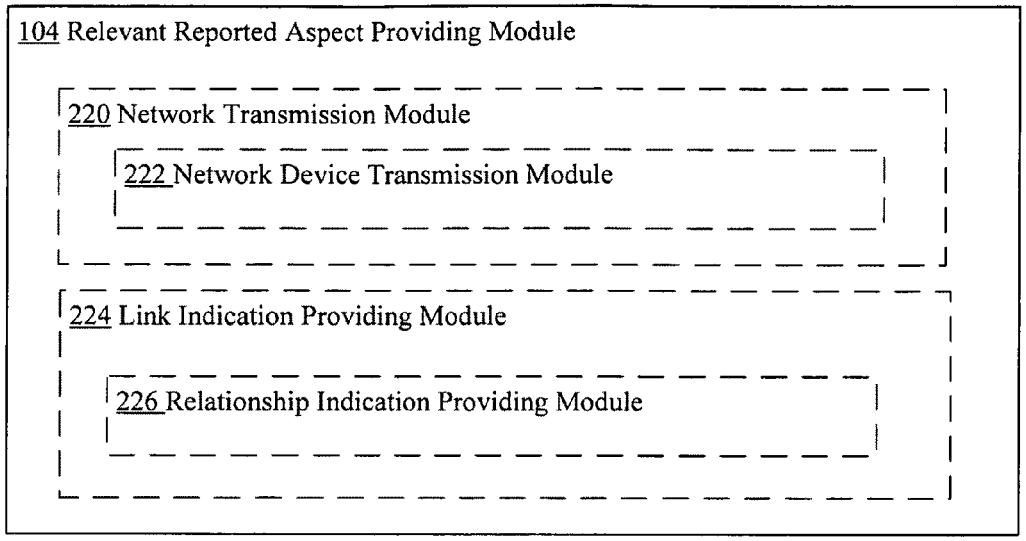
FIG. 2b shows another perspective of the Relevant Reported Aspect Providing Module 104 of the Computing Device 10 of FIG. 1b.

The computing device 10 as illustrated in FIG. 1b may include a variety of modules, sub-modules, and various other components. As shown, the computing device 10 may include at least a relevant reported aspect identification module 102 (which may further include one or more sub-modules as illustrated in FIG. 2a) and a relevant reported aspect providing module 104 (which may further include one or more sub-modules as illustrated in FIG. 2b). In various embodiments, the computing device 10 may further include a memory 116 (which may store a plurality of reported aspects 15 that may further include one or more relevant reported aspects 14 and one or more non-relevant reported aspects 16, one or more end user relevancy indications 142, one or more source user relevancy indications 144, one or more third party source relevancy indications 145, one or more predefined time increment indications 146, and/or one or more applications 140), a network interface 118 (e.g., network interface card or NIC), a user interface 120, a social networking entry reception module 110 (which may further include a blog entry reception module 111 and/or a status report reception module 112), a journal entry reception module 114, a sensor data reception module 115, and/or a solicitation reception module 122 that is designed to receive one or more solicitations 13 via, for example, a wireless network and/or wired network 50 or via user interface 120. In embodiments where the computing device 10 is a source user device, the computing device 10 may include one or more integrated sensors 240 that are designed to sense or detect one or more aspects associated with one or more source users 2*.

Referring to the relevant reported aspect identification module 102, the relevant reported aspect identification module 102 may be configured to, among other things, identify one or more relevant reported aspects 14 based, at least in part, on relevancy of the one or more relevant reported aspects 14 with respect to achievement of one or more target outcomes, the one or more relevant reported aspects 14 to be identified being associated with one or more source users 2* and being relevant to achieving the one or more target outcomes, and the identification of the one or more relevant reported aspects being in response to reception of one or more solicitations 13. In contrast, the relevant reported aspect providing module 104 may be configured to, among other things, provide the identified one or more relevant reported aspects 14.

The memory 116 may be designed to store various data including a plurality of reported aspects 15 associated with one or more source user 2*. The plurality of reported aspects 15 stored in the memory 116 may include both relevant reported aspects 14 that are relevant to achieving one or more target outcomes and non-relevant reported aspects 16 that may not be relevant to achieving any of the one or more target outcomes. Other types of data may be stored in the memory 116 in various implementations including, for example, one or more end user relevancy indications 142 (e.g., one or more indications that indicate the types of reported aspects that an end user 4 has an interest in or believes is relevant to achieving one or more target outcomes) and/or one or more source user relevancy indications 144 (e.g., one or more indications provided by a source user 2* that indicate at least which types of reported aspects are relevant to achieving one or more target outcomes).

In some cases, the memory 116 may also include, for example, one or more third party source relevancy indications 145 (e.g., one or more indications provided by one or more third party sources such as one or more third parties 6 that indicate at least which types of reported aspects are relevant to achieving one or more target outcomes), one or more predefined time increment indications 146 (e.g., one or more indications that indicate at least one time increment, such as a time interval or window, that may be considered in order to determine whether, for example, a reported aspect is relevant for achieving a target outcome if the reported aspect indicate an aspect that occurred within the time increment from an occurrence of the target outcome as successfully achieved by, for example, a source user 2*), and/or one or more applications 140 (e.g., a text messaging application, an instant messaging application, an email application, a social networking application, a voice recognition system, a Web 1.0 application, and/or Web 2.0 application to facilitate in communicating via, for example, the World Wide Web). In various implementations, the memory 116 may comprise of one or more of a mass storage device, a read-only memory (ROM), a programmable read-only memory (PROM), an erasable programmable read-only memory (EPROM), a cache memory such as random access memory (RAM), a flash memory, a synchronous random access memory (SRAM), a dynamic random access memory (DRAM), and/or other types of memory devices.

The social networking entry reception module 110 may be configured to receive social networking entries from one or more sources including, for example, from one or more source users 2*, from one or more end users 4*, from one or more third parties 6, from one or more sensing devices 40, and/or from one or more network servers 60. The social networking entry reception module 110 may further include a blog entry reception module 111 for receiving blog entries (e.g. microblog entries) and/or a status report reception module 112 for receiving social networking status reports. The journal entry reception module 114 may be configured to receive journal entries from, for example, one or more source users 2*, one or more end users 4*, and/or one or more third parties 6 (e.g., a non-user). The sensor data reception module 115 may be configured to receive sensing data that indicate one or more reported aspects 15 associated with one or more source users 2* from one or more sensing devices 40 or one or more integrated sensors 240. The user interface 120 may include one or more of, for example, a display monitor, a touchscreen, a keyboard, a keypad, a mouse, an audio system including one or more speakers, a microphone, an image capturing device such as a digital camera, and so forth.

FIG. 2a illustrates particular implementations of the relevant reported aspect identification module 102 of the computing device 10 of FIG. 1b. As illustrated, the relevant reported aspect identification module 102 may include, in various implementations, one or more sub-modules. For example, in some implementations, the relevant reported aspect identification module 102 may include a source user associated reported aspect identification module 202 that is configured to identify the one or more relevant reported aspects 14 that are associated with one or more source users 2* and that are relevant to achieving the one or more target outcomes by at least identifying one or more reported aspects 15 that are associated with the one or more source users 2*, the one or more source users 2* having achieved the one or more target outcomes.

The source user associated reported aspect identification module 202 may further include a target outcome corresponding reported aspect identification module 204 and/or an associated source user determination module 206. The target outcome corresponding reported aspect identification module 204 may be configured to identify the one or more relevant reported aspects 14 by at least identifying one or more reported aspects 15 that correspond to the one or more target outcomes. In contrast, the associated source user determination module 206 may be configured to determine one or more source users 2* who are associated with the one or more reported aspects 15 that correspond to the one or more target outcomes. In doing so, the one or more source users 2* who have achieved the one or more target outcomes may be identified or determined. Based on the determination of the one or more source users 2* who have achieved the one or more target outcomes, the relevant reported aspect identification module 102 may identify one or more reported aspects 15 that are associated with the one or more source users 2* who have achieved the target outcomes.

In some implementations, the relevant reported aspect identification module 102 may include a relevancy factor relevant reported aspect identification module 208 and/or a log entry originated relevant reported aspect identification module 212. In brief, the relevancy factor relevant reported aspect identification module 208 may be configured to identify one or more reported aspects 14 that are relevant for achieving one or more target outcomes with respect to one or more relevancy factors (e.g., the one or more reported aspects 14 belonging to a type or types of aspects that are of interest to an end user 4*). In contrast, the log entry originated relevant reported aspect identification module 212 may be configured to identify the one or more relevant reported aspects 14 by identifying one or more reported aspects 15 that were originally reported through log entries (e.g., microblog entries, status reports, and so forth).

FIG. 2b illustrates particular implementations of the relevant reported aspect providing module 104 of FIG. 1b. The relevant reported aspect providing module 104, as illustrated, may include one or more sub-modules. For example, in various implementations, the relevant reported aspect providing module 104 may include a network transmission module 220 that is configured to transmit the one or more relevant reported aspects 14 via a wireless network and/or a wired network 50 (e.g., via at least one of a wireless network and a wired network 50). In some implementations, the network transmission module 220 may further include a network device transmission module 222 configured to transmit the one or more relevant reported aspects 14 to one or more network devices (e.g., network servers 60, local source user devices 20*, local end user devices 30, and/or other network devices).

In various implementations, the relevant reported aspect providing module 104 may include a link indication providing module 224 that is configured to provide one or more indications that links (e.g., associates) two or more relevant reported aspects 14 together. In some implementations, development of a template or a personalized plan designed to achieve one or more target outcomes and that is developed based on the two or more relevant reported aspects 14 may be facilitated by indicating the link between the two or more relevant reported aspects 14. In some cases, the link indication providing module 224 may further include a relationship indication providing module 226 configured to provide one or more indications that indicate one or more relationships (e.g., temporal, specific time, or spatial relationships) between the two or more relevant reported aspects 14. Such indications may also be useful in order to, for example, develop a template or a personalized plan designed to achieve one or more target outcomes. In particular, by providing the one or more indications of the one or more relationships between the two or more relevant reported aspects 14, the development of a template or a personalized plan (e.g., a template or personalized plan that may be embodied by, for example, a schedule of emulatable aspects) designed to achieve one or more target outcomes may be better facilitated (e.g., providing a basis for the relationships between the emulatable aspects that may be included in the template or the personalized plan).

Figure 2C:
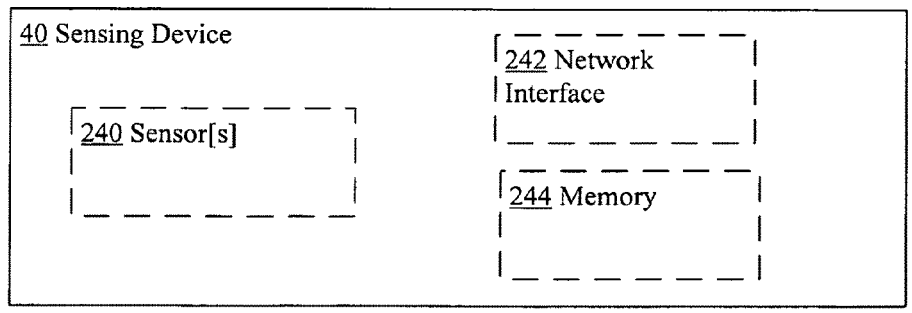
FIG. 2c shows one perspective of one of the Sensing Devices 40 of the environment of FIGS. 1a and 1b.

Referring now to FIG. 2c illustrating one of the sensing devices 40 of FIGS. 1a and 1b. The sensing device 40, in various implementations, may include at least one or more sensors 240. The one or more sensors 240 that may be included in a sensing device 40 (as well as the computing device 10) may be designed to sense or detect one or more aspects associated with one or more source users 2*. For example, in various implementations, the one or more sensors 240 may include one or more devices that can monitor a user's physiological characteristics such as blood pressure sensors, heart rate monitors, glucometers (e.g., blood glucose meter), and so forth.

In some implementations, the one or more sensors 240 may include devices that can detect activities of a user (e.g., a source user 2*). Examples of such devices include, for example, a pedometer, a toilet monitoring system (e.g., to monitor bowel movements), exercise machine sensors, an accelerometer to measure a person's movements which may indicate specific activities, and so forth. The one or more sensors 240 may also include, in various implementations, other types of sensor/monitoring devices such as video or digital camera to provide electronic images of, for example, the one or more target outcomes as displayed by a source user 2*, global positioning system (GPS) to provide location data related to a user (e.g., locations of the source user 2*), and so forth. In various implementations, a sensing device 40 may further include a network interface 242 and/or a memory 244. The network interface 242 may be designed to interface with a wireless network and/or a wired network 50 while the memory 244 may be designed to store, for example, sensing data provided by the one or more sensors 240.

Referring back to the computing device 10 of FIG. 1b, the various modules (e.g., the relevant reported aspect identification module 102, the relevant reported aspect providing module 104, and so forth) along with their sub-modules included in the computing device 10 may be implemented using hardware, software, firmware, or any combination thereof. For example, in some implementations, the relevant reported aspect identification module 102 and/or the relevant reported aspect providing module 104 may be implemented with a processor 602 (e.g., microprocessor, controller, and so forth) executing computer readable instructions 604 (e.g., computer program product) stored in a storage medium 606 (e.g., volatile or non-volatile memory) such as a signal-bearing medium as depicted in the computing device 10 of FIG. 6. Alternatively, hardware such as application specific integrated circuit (ASIC) may be employed in order to implement such modules in some alternative implementations.

Figure 3:
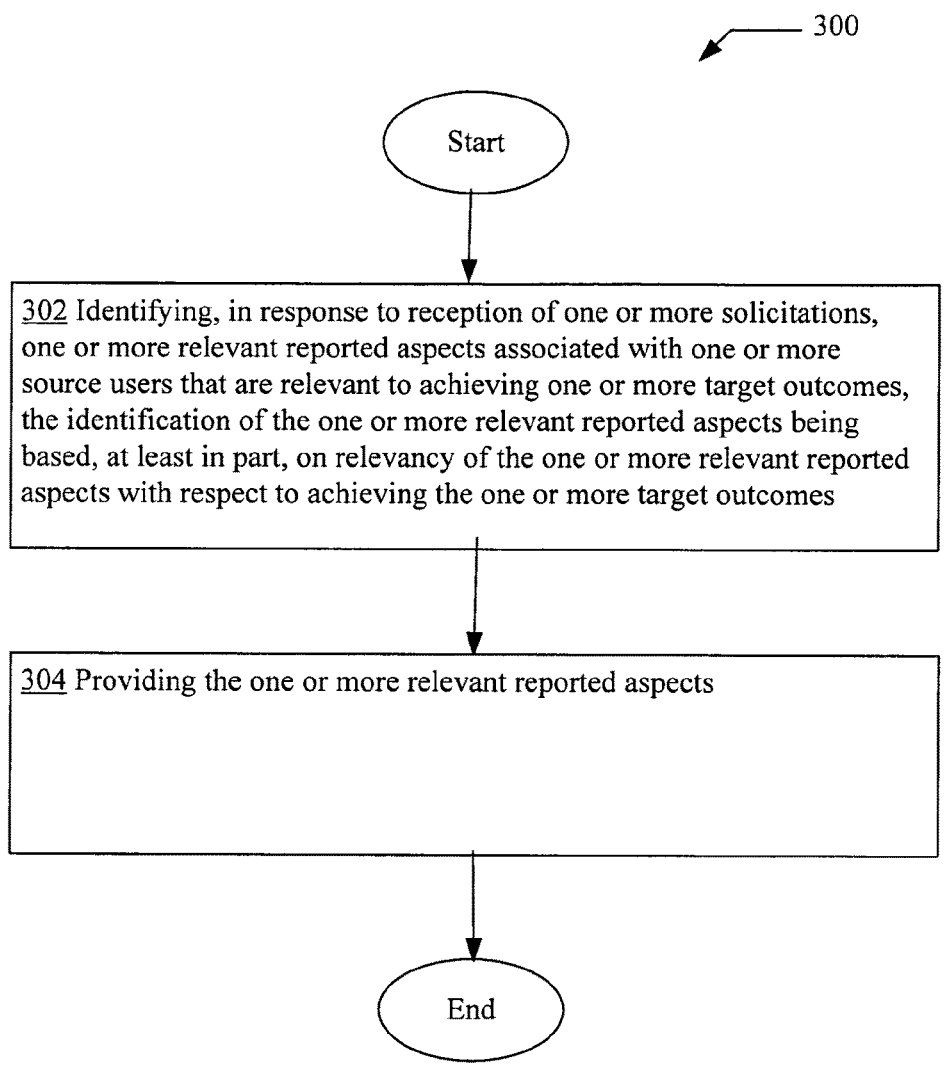
FIG. 3 is a high-level logic flowchart of a process.

A more detailed discussion related to the computing device 10 of FIG. 1b will now be provided with respect to the processes and operations to be described herein. FIG. 3 illustrates an operational flow 300 representing example operations related to, among other things, identification (e.g., selective identification) of one or more relevant reported aspects 14 associated with one or more source users 2* that are relevant to achieving one or more target outcomes, the identification of the one or more relevant reported aspects being based, at least in part, on relevancy of the one or more relevant reported aspects 14 with respect to the achievement of the one or more target outcomes, the identification being in response to reception of one or more solicitations 13, and the providing of the one or more relevant reported aspects 14 that were identified.

In FIG. 3 and in the following figures that include various examples of operational flows, discussions and explanations may be provided with respect to the exemplary environment 100 described above as illustrated in FIGS. 1a and 1b, and/or with respect to other examples (e.g., as provided in FIGS. 2a, 2b, and 2c) and contexts. However, it should be understood that the operational flows may be executed in a number of other environments and contexts, and/or in modified versions of FIGS. 1a, 1b, 2a, 2b, and 2c. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a relevant reported aspect identifying operation 302 for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes. For instance, and as an illustration, the relevant reported aspect identification module 102 of the computing device 10 of FIG. 1b identifying (e.g., finding, locating, searching, distinguishing, and so forth), in response to reception of one or more solicitations 13 (e.g., requests, queries, commands, and so forth), one or more relevant reported aspects 14 associated with one or more source users 2* that are relevant to achieving one or more target outcomes, the identification of the one or more relevant reported aspects 14 being based, at least in part, on relevancy of the one or more relevant reported aspects 14 with respect to achieving the one or more target outcomes.

Note that in various implementations, the one or more solicitations 13 to be received may be for soliciting the one or more relevant reported aspects 14. Alternatively, the one or more solicitations 13 may be for soliciting data for developing one or more personalized plans or templates that may be designed to facilitate an end user 4* to achieve the one or more target outcomes. In other implementations, the one or more solicitations 13 may be for soliciting other types of data.

In addition to the relevant reported aspect identifying operation 302, operational flow 300 may also include a relevant reported aspect providing operation 304 for providing the one or more relevant reported aspects. For instance, the relevant reported aspect providing module 104 of the computing device 10 providing (e.g., transmitting, indicating, displaying, allowing access to, and so forth) the one or more relevant reported aspects 14. As will be further described herein, the relevant reported aspect identifying operation 302 as well as the relevant reported aspect providing operation 304 may be implemented in a number of different ways in various alternative implementations.

Figure 4A:
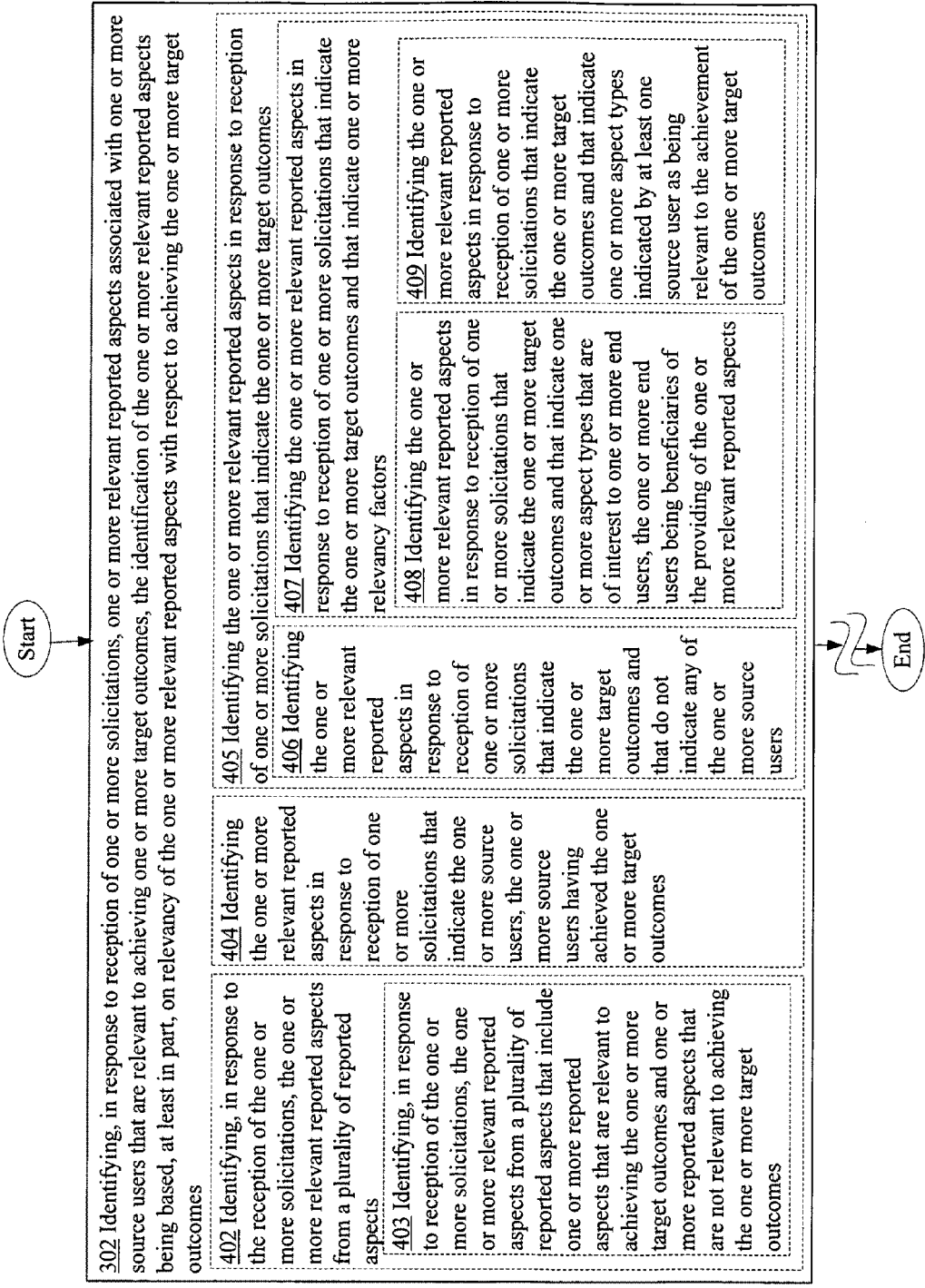
FIG. 4a is a high-level logic flowchart of a process depicting alternate implementations of the relevant reported aspect identifying operation 302 of FIG. 3.

For example, FIGS. 4a, 4b, 4c, 4d, 4e, 4f, 4g, and 4h illustrate the various ways that the relevant reported aspect identifying operation 302 of FIG. 3 may be implemented in various alternative implementations. In some implementations, for example, the relevant reported aspect identifying operation 302 of FIG. 3 may include an operation 402 for identifying, in response to the reception of the one or more solicitations, the one or more relevant reported aspects from a plurality of reported aspects as depicted in FIG. 4a. For instance, the relevant reported aspect identification module 102 of the computing device 10 of FIG. 1b identifying, in response to receiving the one or more solicitations 13 (e.g., as received by the solicitation reception module 122), the one or more relevant reported aspects 14 from a plurality of reported aspects 15.

In some implementations, operation 402 may further include an operation 403 for identifying, in response to the reception of the one or more solicitations, the one or more relevant reported aspects from a plurality of reported aspects that include one or more reported aspects that are relevant to achieving the one or more target outcomes and one or more reported aspects that are not relevant to achieving the one or more target outcomes as depicted in FIG. 4a. For instance, the relevant reported aspect identification module 102 of the computing device 10 identifying, in response to receiving the one or more solicitations 13, the one or more relevant reported aspects 14 from a plurality of reported aspects 15 that include one or more reported aspects that are relevant to achieving the one or more target outcomes (e.g., one or more relevant reported aspects 14) and one or more reported aspects 16 that are not relevant to achieving the one or more target outcomes.

In the same or different implementations, the relevant reported aspect identifying operation 302 of FIG. 3 may include an operation 404 for identifying the one or more relevant reported aspects in response to reception of one or more solicitations that indicate the one or more source users, the one or more source users having achieved the one or more target outcomes as depicted in FIG. 4a. For instance, the relevant reported aspect identification module 102 of the computing device 10 identifying the one or more relevant reported aspects 14 in response to reception of one or more solicitations 13 that indicate the one or more source users 2*, the one or more source users 2* having achieved the one or more target outcomes.

In the same or different implementations, the relevant reported aspect identifying operation 302 may include an operation 405 for identifying the one or more relevant reported aspects in response to reception of one or more solicitations that indicate the one or more target outcomes as depicted in FIG. 4a. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes.

In various implementations, operation 405 may include one or more additional operations. For example, in some implementations, operation 405 may include an operation 406 for identifying the one or more relevant reported aspects in response to reception of one or more solicitations that indicate the one or more target outcomes and that do not indicate any of the one or more source users as depicted in FIG. 4a. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes and that do not indicate any of the one or more source users 2*.

In the same or different implementations, operation 405 may include an operation 407 for identifying the one or more relevant reported aspects in response to reception of one or more solicitations that indicate the one or more target outcomes and that indicate one or more relevancy factors as depicted in FIG. 4a. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes and that indicate one or more relevancy factors (e.g., bases for determining whether a reported aspect is relevant to achieving one or more target outcomes).

Operation 407 in turn may further include an operation 408 for identifying the one or more relevant reported aspects in response to reception of one or more solicitations that indicate the one or more target outcomes and that indicate one or more aspect types that are of interest to one or more end users, the one or more end users being beneficiaries of the providing of the one or more relevant reported aspects as depicted in FIG. 4a. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes and that indicate one or more aspect types (e.g., dietary activities, sleep or rest activities, reading activities, user locations, mental states, and so forth) that are of interest to one or more end users 4*, the one or more end users 4* being beneficiaries of the providing of the one or more relevant reported aspects 14.

In the same or different implementations, operation 407 may include an operation 409 for identifying the one or more relevant reported aspects in response to reception of one or more solicitations that indicate the one or more target outcomes and that indicate one or more aspect types indicated by at least one source user as being relevant to the achievement of the one or more target outcomes as depicted in FIG. 4a. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes and that indicate one or more aspect types (e.g., exercise activities, medication usage, mental attitudes, social or employment activities, and so forth) indicated by at least one source user 2* as being relevant to the achievement of the one or more target outcomes (e.g., losing weight, feeling more alert, reduce pain, increase sexual intimacy activities, and so forth).

Figure 4B:
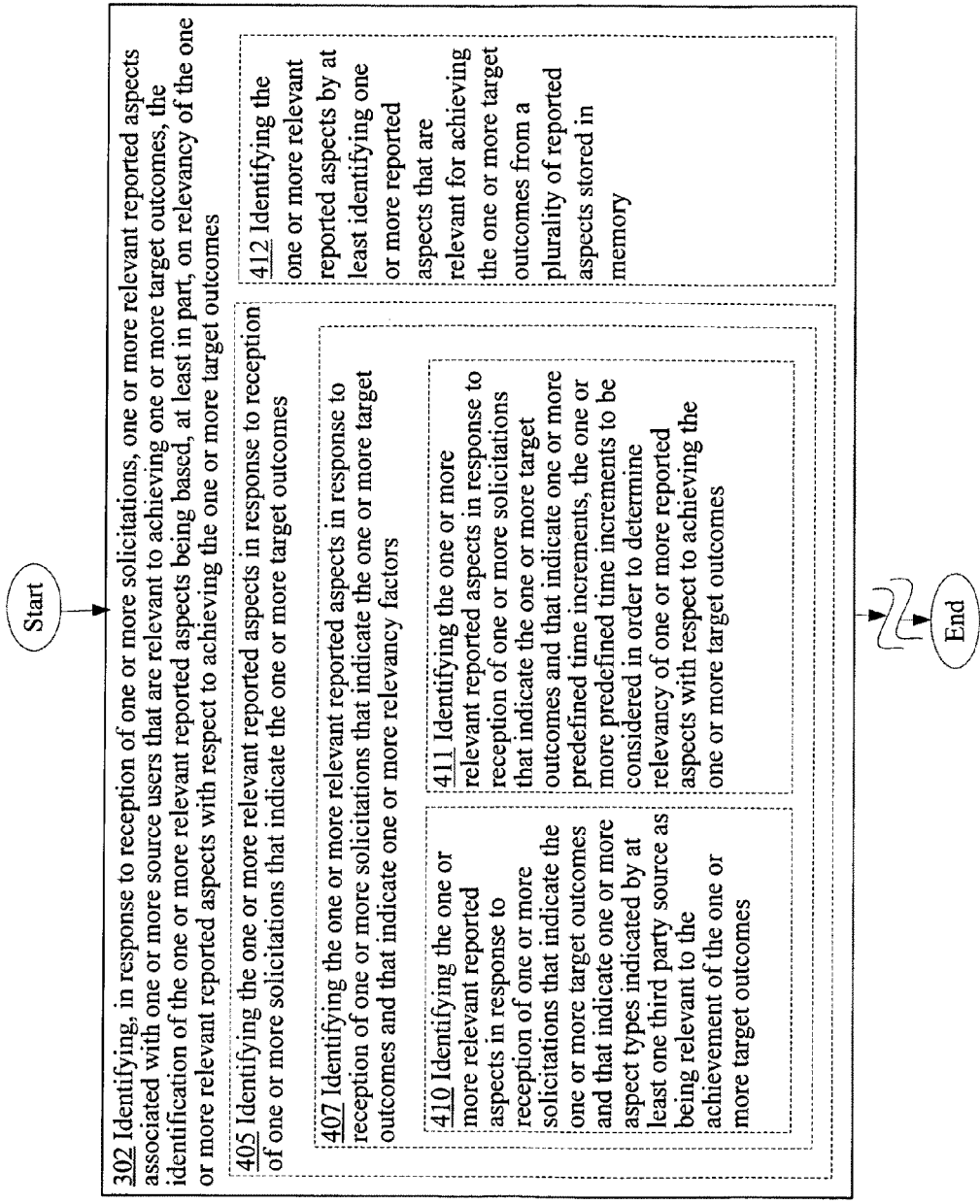
FIG. 4b is a high-level logic flowchart of a process depicting alternate implementations of the relevant reported aspect identifying operation 302 of FIG. 3.

In the same or different implementations, operation 407 may include an operation 410 for identifying the one or more relevant reported aspects in response to reception of one or more solicitations that indicate the one or more target outcomes and that indicate one or more aspect types indicated by at least one third party source as being relevant to the achievement of the one or more target outcomes as depicted in FIG. 4b. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes and that indicate one or more aspect types indicated by at least one third party source 6 as being relevant to the achievement of the one or more target outcomes.

In the same or different implementations, operation 407 may include an operation 411 for identifying the one or more relevant reported aspects in response to reception of one or more solicitations that indicate the one or more target outcomes and that indicate one or more predefined time increments, the one or more predefined time increments to be considered in order to determine relevancy of one or more reported aspects with respect to achieving the one or more target outcomes as depicted in FIG. 4b. For instance, the relevant reported aspect identification module 102 of the computing device 10 identifying the one or more relevant reported aspects 14 in response to reception (e.g., reception by the solicitation module 122) of one or more solicitations 13 that indicate the one or more target outcomes and that indicate one or more predefined time increments, the one or more predefined time increments (e.g., one day, one week, three months, one year, five years, and so forth) to be considered in order to determine relevancy of one or more reported aspects 15 with respect to achieving the one or more target outcomes. For example, such predefined time periods may be used in order to eliminate from consideration those reported aspects 15 that are associated with one or more source users 2* who have achieved the one or more target outcomes but indicate aspects that occurred remotely from the accomplishment of the one or more target outcomes by the one or more source users 2*.

In various implementations, the relevant reported aspect identifying operation 302 of FIG. 3 may include an operation 412 for identifying the one or more relevant reported aspects by at least identifying one or more reported aspects that are relevant for achieving the one or more target outcomes from a plurality of reported aspects stored in memory as depicted in FIG. 4b. For instance, the relevant reported aspect identification module 102 of the computing device 10 identifying the one or more relevant reported aspects 14 by at least identifying one or more reported aspects (e.g., relevant reported aspects 14) that are relevant for achieving the one or more target outcomes from a plurality of reported aspects 15 stored in memory 116.

Figure 4C:
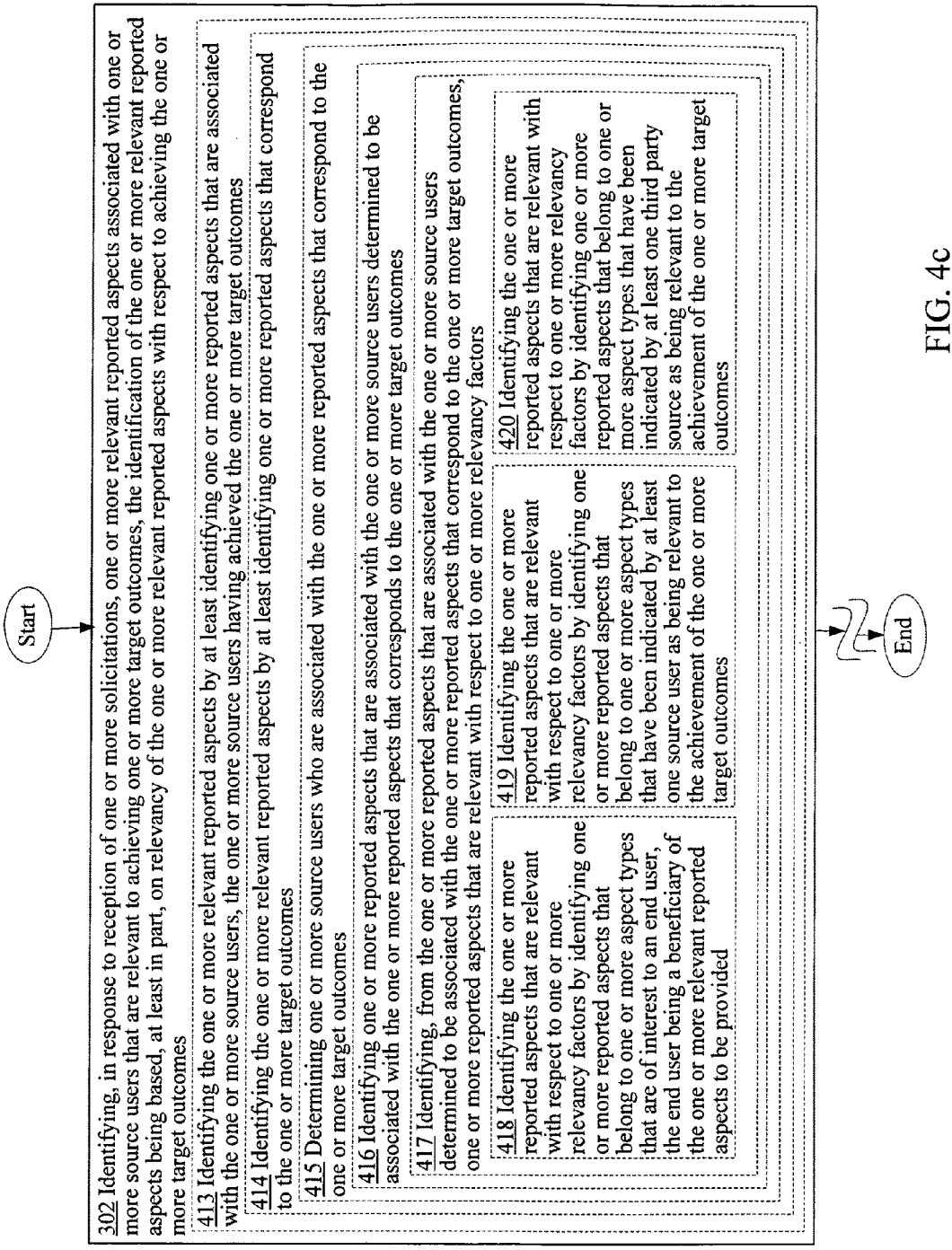
FIG. 4c is a high-level logic flowchart of a process depicting alternate implementations of the relevant reported aspect identifying operation 302 of FIG. 3.

In order to identify relevant reported aspects 14 of one or more source users 2* that are relevant for achieving one or more target outcomes from, for example, a plurality of reported aspects 15, the relevant reported aspect identifying operation 302 of FIG. 3 may include one or more operations to identify one or more source users 2* who have been reported as having successfully achieved the one or more target outcomes. For example, in some implementations, the relevant reported aspect identifying operation 302 may include an operation 413 for identifying the one or more relevant reported aspects by at least identifying one or more reported aspects that are associated with the one or more source users, the one or more source users having achieved the one or more target outcomes as depicted in FIG. 4c. For instance, the relevant reported aspect identification module 102 of the computing device 10 identifying the one or more relevant reported aspects 14 by having the source user associated reported aspect identification module 202 (see FIG. 2a) at least identify one or more reported aspects 15 that are associated with the one or more source users 2*, the one or more source users 2* having achieved the one or more target outcomes.

In order to identify the one or more reported aspects 15 that are associated with the one or more source users 2* who have achieved the one or more target outcomes, operation 413 may include an operation to identify those reported aspects 15 that corresponds to the one or more target outcomes. For example, in some implementations, operation 413 may include an operation 414 for identifying the one or more relevant reported aspects by at least identifying one or more reported aspects that correspond to the one or more target outcomes as depicted in FIG. 4c. For instance, the relevant reported aspect identification module 102 of the computing device 10 identifying the one or more relevant reported aspects 14 by having the target outcome corresponding reported aspect identification module 204 (see FIG. 2a) at least identify one or more reported aspects 15 that correspond (e.g., equivalent or substantially equivalent) to the one or more target outcomes.

In order to identify the one or more relevant reported aspects 14, operation 414 may include an operation 415 for determining one or more source users who are associated with the one or more reported aspects that correspond to the one or more target outcomes as depicted in FIG. 4c. For instance, the associated source user determination module 206 (see FIG. 2a) of the computing device 10 determining one or more source users 2* who are associated with the one or more reported aspects 15 that correspond (e.g., equivalent or substantially equivalent) to the one or more target outcomes.

In some implementations, in order to identify the one or more relevant reported aspects 14 operation 415 may include at least an operation 416 for identifying one or more reported aspects that are associated with the one or more source users determined to be associated with the one or more reported aspects that corresponds to the one or more target outcomes as depicted in FIG. 4c. For instance, the relevant reported aspect identification module 102 of the computing device 10 identifying one or more reported aspects 15 that are associated with the one or more source users 2* determined to be associated with the one or more reported aspects 15 that corresponds to the one or more target outcomes.

In various implementations, operation 416 may include an operation 417 for identifying, from the one or more reported aspects that are associated with the one or more source users determined to be associated with the one or more reported aspects that correspond to the one or more target outcomes, one or more reported aspects that are relevant with respect to one or more relevancy factors as depicted in FIG. 4c. For instance, the relevancy factor relevant reported aspect identification module 208 (see FIG. 2a) of the computing device 10 identifying, from the one or more reported aspects 15 that are associated with the one or more source users 2* determined to be associated with the one or more reported aspects 15 that correspond to the one or more target outcomes, one or more reported aspects 15 that are relevant with respect to one or more relevancy factors. Examples of relevancy factors include, for example, indentifying reported aspects 15 that are associated with specific source users 2* such as those source users 2* who have achieved the one or more target outcomes and who share certain common traits (e.g., ethnicity, religious beliefs, mental or physical handicaps, common social or employment networking groups, common health or medical states, and so forth) with an end user 4*).

The one or more relevancy factors considered in operation 417 may be provided by a variety of sources. For example, in some implementations, operation 417 may include an operation 418 for identifying the one or more reported aspects that are relevant with respect to one or more relevancy factors by identifying one or more reported aspects that belong to one or more aspect types that are of interest to an end user, the end user being a beneficiary of the one or more relevant reported aspects to be provided as depicted in FIG. 4c. For instance, the relevancy factor relevant reported aspect identification module 208 of the computing device 10 identifying the one or more reported aspects 15 that are relevant with respect to one or more relevancy factors by identifying one or more reported aspects that belong to one or more aspect types (e.g., dietary behaviors, exercise behavior, reported aspects 14 associated with source users 2* who share a common trait with the end user 4*, and so forth) that are of interest to an end user 4*, the end user 4* being a beneficiary (e.g., recipient of the one or more relevant reported aspects 14 or a product, such as a personalized plan or a template, that may be generated from the one or more relevant reported aspects 14) of the one or more relevant reported aspects to be provided.

In the same or different implementations, operation 417 may include an operation 419 for identifying the one or more reported aspects that are relevant with respect to one or more relevancy factors by identifying one or more reported aspects that belong to one or more aspect types that have been indicated by at least one source user as being relevant to the achievement of the one or more target outcomes as depicted in FIG. 4c. For instance, the relevancy factor relevant reported aspect identification module 208 of the computing device 10 identifying the one or more reported aspects that are relevant with respect to one or more relevancy factors by identifying one or more reported aspects 15 that belong to one or more aspect types (e.g., mental states, attitudes, spiritual or religious beliefs, conduct, and so forth) that have been indicated by at least one source user 2* as being relevant to the achievement of the one or more target outcomes (e.g., reduced blood pressure or reduced stress).

In the same or different implementations, operation 417 may include an operation 420 for identifying the one or more reported aspects that are relevant with respect to one or more relevancy factors by identifying one or more reported aspects that belong to one or more aspect types that have been indicated by at least one third party source as being relevant to the achievement of the one or more target outcomes as depicted in FIG. 4c. For instance, the relevancy factor relevant reported aspect identification module 208 of the computing device 10 identifying the one or more reported aspects 15 that are relevant with respect to one or more relevancy factors by identifying one or more reported aspects that belong to one or more aspect types (e.g., sleep activities, dietary habits, exercise activities) that have been indicated by at least one third party source as being relevant to the achievement of the one or more target outcomes (e.g., weight loss).

Figure 4D:
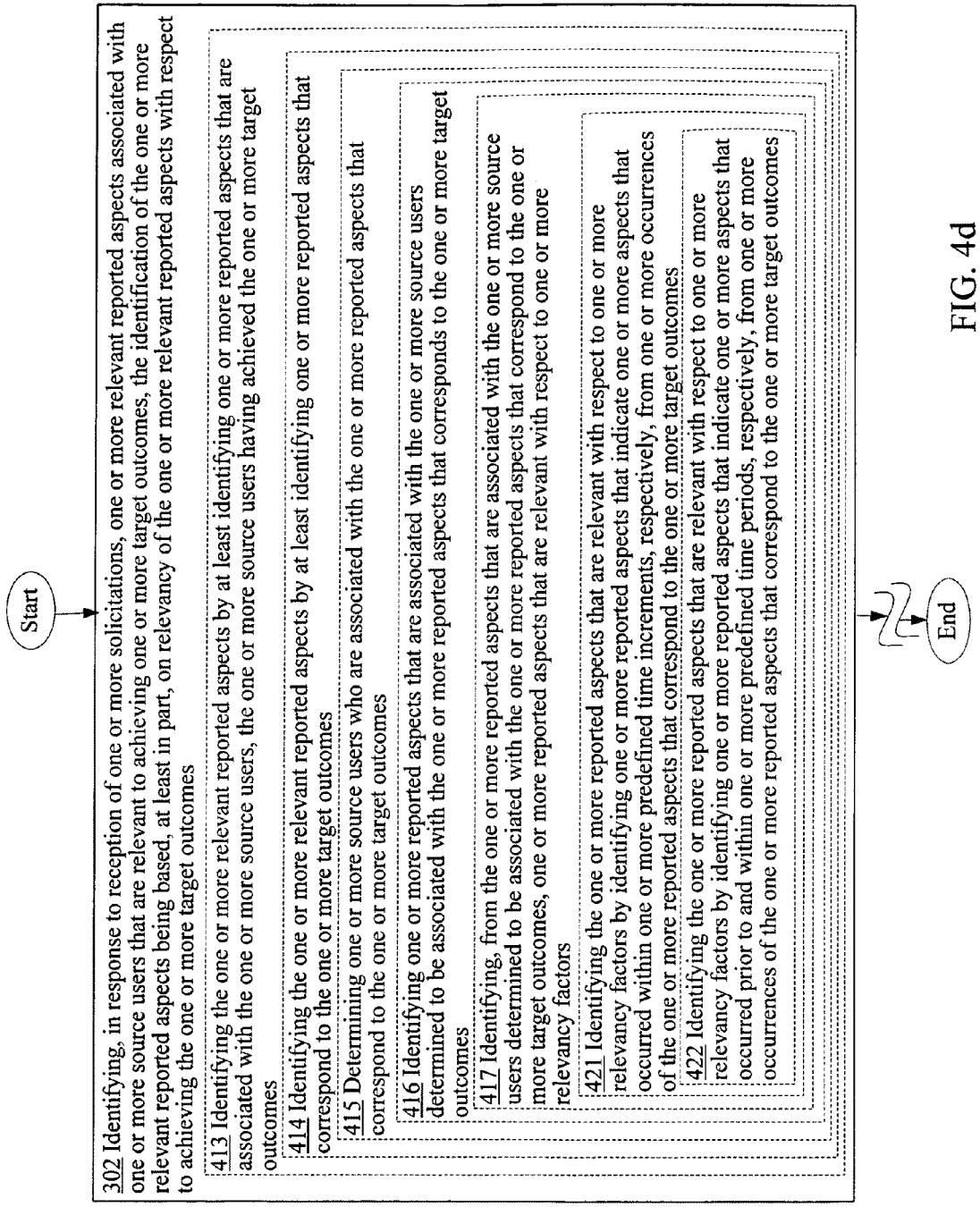
FIG. 4d is a high-level logic flowchart of a process depicting alternate implementations of the relevant reported aspect identifying operation 302 of FIG. 3.

In the same or different implementations, operation 417 may include an operation 421 for identifying the one or more reported aspects that are relevant with respect to one or more relevancy factors by identifying one or more reported aspects that indicate one or more aspects that occurred within one or more predefined time increments, respectively, from one or more occurrences of the one or more reported aspects that correspond to the one or more target outcomes as depicted in FIG. 4d. For instance, the relevancy factor relevant reported aspect identification module 208 of the computing device 10 identifying the one or more reported aspects 15 that are relevant with respect to one or more relevancy factors by identifying one or more reported aspects 15 that indicate one or more aspects that occurred within one or more predefined time increments (e.g., one day, one week, three months, one year, five years, and so forth), respectively, from one or more occurrences of the one or more reported aspects 15 that correspond to the one or more target outcomes.

That is, not all relevant reported aspects 14 that may be relevant with respect to certain relevancy factors may actually be relevant to achieving the one or more target outcomes if the relevant reported aspects 14 indicate aspects that, time-wise, occurred remotely from occurrence of the one or more target outcomes as successfully achieved by the one or more source users 2* who have been reported as achieving the one or more target outcomes. For example, reported aspects 15 that are associated with source users 2* who have achieved the one or more target outcomes and that are relevant based on certain relevancy factors (e.g., belong to a type of aspect that is of interest to the end user 4* such as dietary behavior) may, nevertheless, not be relevant to achieving the one or more target outcomes if they occurred well before (or well after) the achievement of the one or more target outcomes (e.g., 20 pounds of weight loss as indicated by one or more reported aspects 15 that corresponds to the one or more target outcomes) by the one or more source users 2*.

Thus, a reported aspect 15 may, in some cases, be relevant to the achievement of the one or more target outcomes only if it falls within some time increment (e.g., "predefined time increment") from the one or more occurrences of the one or more reported aspects 15 that correspond to the one or more target outcomes. The length of the predefined time increments to be considered in determining relevancy may depend on a number of factors including how the relevant reported aspects 14 may be used (e.g., to develop personalized plans for achieving target outcomes). The predefined time increments, in various implementations, may be provided by an end user 4*, by a source user 2*, or by a third party source (e.g., third party 6).

In various implementations, operation 421 may, in turn, include an operation 422 for identifying the one or more reported aspects that are relevant with respect to one or more relevancy factors by identifying one or more reported aspects that indicate one or more aspects that occurred prior to and within one or more predefined time periods, respectively, from one or more occurrences of the one or more reported aspects that correspond to the one or more target outcomes as depicted by FIG. 4d. For instance, the relevancy factor relevant reported aspect identification module 208 of the computing device 10 identifying the one or more reported aspects 15 that are relevant with respect to one or more relevancy factors by identifying one or more reported aspects 15 that indicate one or more aspects that occurred prior to and within one or more predefined time periods, respectively, from one or more occurrences of the one or more reported aspects that correspond to the one or more target outcomes.

Figure 4E:
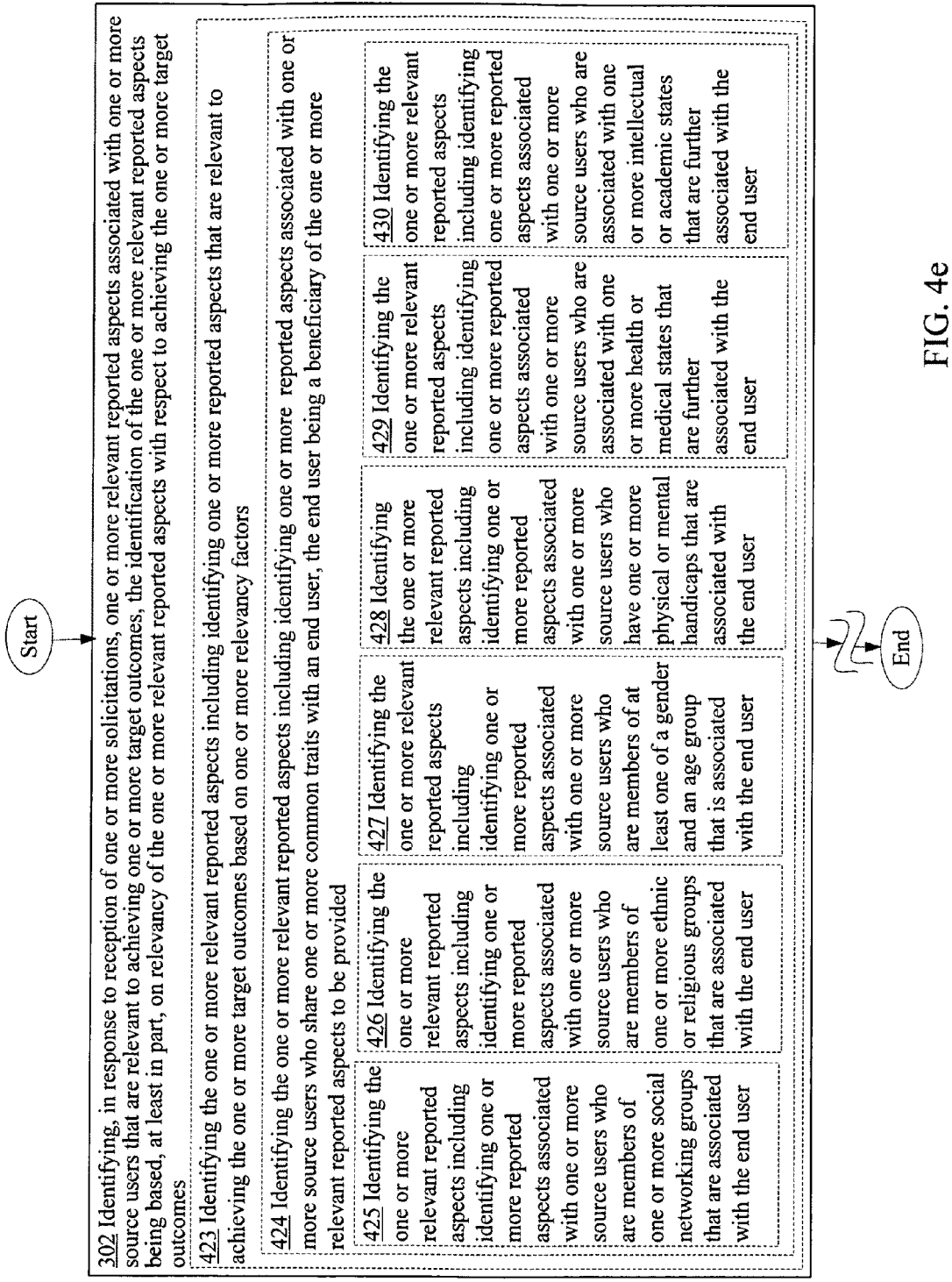
FIG. 4e is a high-level logic flowchart of a process depicting alternate implementations of the relevant reported aspect identifying operation 302 of FIG. 3.

In some implementations, the relevant reported aspect identifying operation 302 may include an operation 423 for identifying the one or more relevant reported aspects including identifying one or more reported aspects that are relevant to achieving the one or more target outcomes based on one or more relevancy factors as depicted in FIG. 4e. For instance, the relevancy factor relevant reported aspect identification module 208 of the computing device 10 identifying the one or more relevant reported aspects 14 including identifying one or more reported aspects 15 that are relevant to achieving the one or more target outcomes based on one or more relevancy factors (e.g., relevancy factors as provided by an end user 4*, by a source user 2*, or by a third party source).

In various implementations, operation 423 may include an operation 424 for identifying the one or more relevant reported aspects including identifying one or more reported aspects associated with one or more source users who share one or more common traits with an end user, the end user being a beneficiary of the one or more relevant reported aspects to be provided as depicted in FIG. 4e. For instance, the relevancy factor relevant reported aspect identification module 208 of the computing device 10 identifying the one or more relevant reported aspects 14 including identifying one or more reported aspects 15 associated with one or more source users 2* who share one or more common traits with an end user 4*, the end user 4* being a beneficiary of the one or more relevant reported aspects 14 to be provided. For these implementations, the end user 4* may be a beneficiary as a result of the end user 4* being the recipient of the one or more relevant reported aspects 14 or recipient of, for example, a personalized plan or template for achieving the one or more target outcomes and that was developed based on the one or more relevant reported aspects 14.

The one or more source users 2* who share one or more common traits with the end user 4* may have a variety of traits that may be shared with the end user 4* and which may be considered in identifying relevant reported aspects 14 in various implementations. For example, in some implementations, operation 424 may include an operation 425 for identifying the one or more relevant reported aspects including identifying one or more reported aspects associated with one or more source users who are members of one or more social networking groups that are associated with the end user as depicted in FIG. 4e. For instance, the relevancy factor relevant reported aspect identification module 208 of the computing device 10 identifying the one or more relevant reported aspects 14 including identifying one or more reported aspects 15 associated with one or more source users 2* who are members of one or more social networking groups that are associated with the end user 4*.

In the same or different implementations, operation 424 may include an operation 426 for identifying the one or more relevant reported aspects including identifying one or more reported aspects associated with one or more source users who are members of one or more ethnic or religious groups that are associated with the end user as depicted in FIG. 4e. For instance, the relevancy factor relevant reported aspect identification module 208 of the computing device 10 identifying the one or more relevant reported aspects 14 including identifying one or more reported aspects 15 associated with one or more source users 2* who are members of one or more ethnic or religious groups (e.g., Hispanic, German, Asian, Christian, Buddhist, and so forth) that are associated with the end user 4*.

In the same or different implementations, operation 424 may include an operation 427 for identifying the one or more relevant reported aspects including identifying one or more reported aspects associated with one or more source users who are members of at least one of a gender and an age group that is associated with the end user as depicted in FIG. 4e. For instance, the relevancy factor relevant reported aspect identification module 208 of the computing device 10 identifying one or more relevant reported aspects 14 including identifying one or more reported aspects 15 associated with one or more source users 2* who are members of at least one of a gender (e.g., female) and an age (e.g., over 65 years of age) group that is associated with the end user 4*.

In the same or different implementations, operation 424 may include an operation 428 for identifying the one or more relevant reported aspects including identifying one or more reported aspects associated with one or more source users who have one or more physical or mental handicaps that are associated with the end user as depicted in FIG. 4e. For instance, the relevancy factor relevant reported aspect identification module 208 of the computing device 10 identifying the one or more relevant reported aspects 14 including identifying one or more reported aspects 15 associated with one or more source users 2* who have one or more physical or mental handicaps (e.g., missing a limb, blindness, phobias, bipolar, and so forth) that are associated with the end user 4*.

In the same or different implementations, operation 424 may include an operation 429 for identifying the one or more relevant reported aspects including identifying one or more reported aspects associated with one or more source users who are associated with one or more health or medical states that are further associated with the end user as depicted in FIG. 4e. For instance, the relevancy factor relevant reported aspect identification module 208 of the computing device 10 the one or more relevant reported aspects 14 including identifying one or more reported aspects 15 associated with one or more source users 2* who are associated with one or more health or medical states (e.g., having cancer, a tobacco user, high blood pressure, and so forth) that are further associated with the end user 4*.

In the same or different implementations, operation 424 may include an operation 430 for identifying the one or more relevant reported aspects including identifying one or more reported aspects associated with one or more source users who are associated with one or more intellectual or academic states that are further associated with the end user as depicted in FIG. 4e. For instance, the relevancy factor relevant reported aspect identification module 208 of the computing device 10 identifying the one or more relevant reported aspects 14 including identifying one or more reported aspects 15 associated with one or more source users 2* who are associated with one or more intellectual or academic states that are further associated with the end user 4*.

Figure 4F:
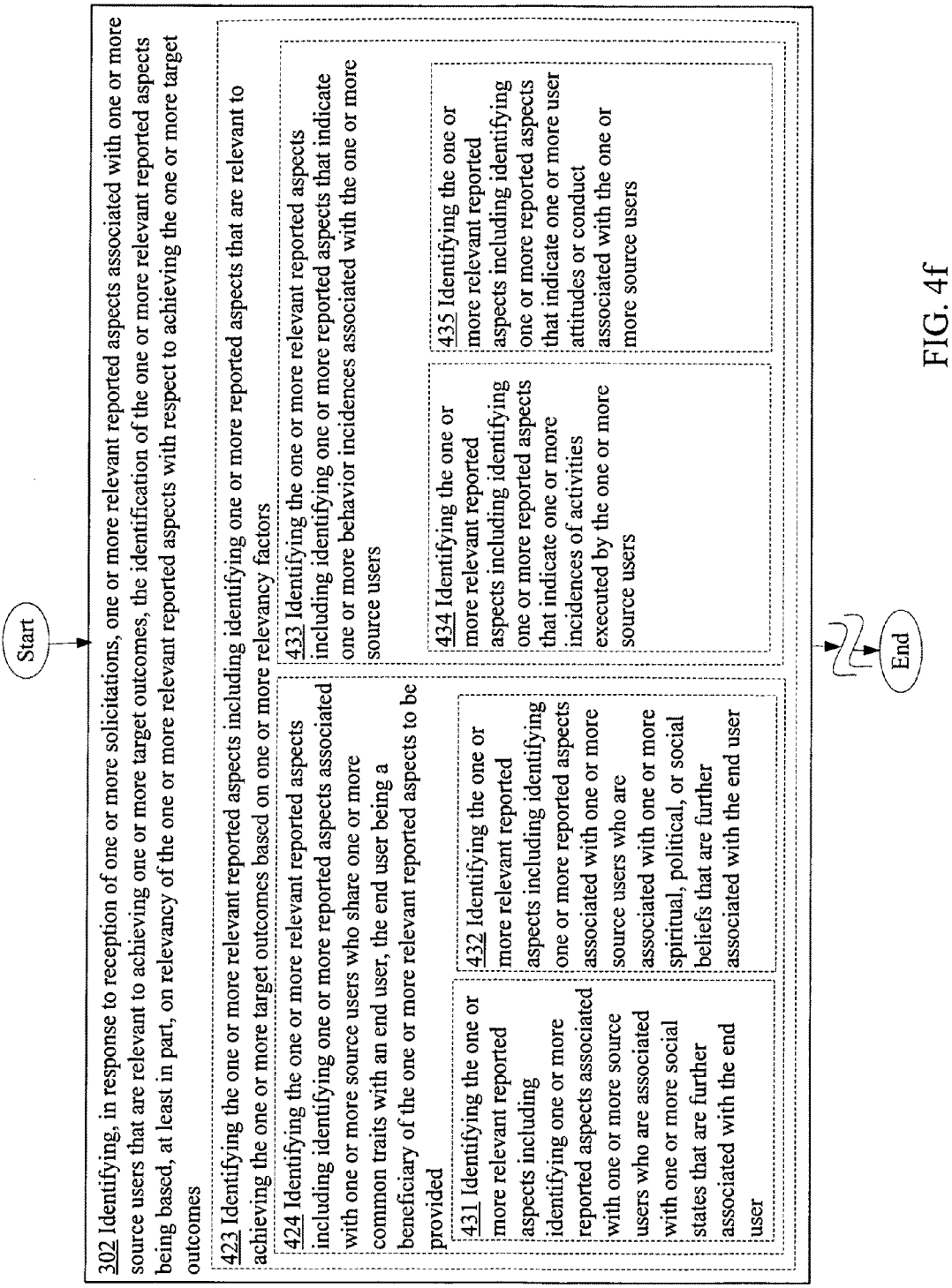
FIG. 4f is a high-level logic flowchart of a process depicting alternate implementations of the relevant reported aspect identifying operation 302 of FIG. 3.

In the same or different implementations, operation 424 may include an operation 431 for identifying the one or more relevant reported aspects including identifying one or more reported aspects associated with one or more source users who are associated with one or more social states that are further associated with the end user as depicted in FIG. 4f. For instance, the relevancy factor relevant reported aspect identification module 208 of the computing device 10 identifying the one or more relevant reported aspects 14 including identifying one or more reported aspects 15 associated with one or more source users 2* who are associated with one or more social states (e.g., unmarried) that are further associated with the end user 4*.

In the same or different implementations, operation 424 may include an operation 432 for identifying the one or more relevant reported aspects including identifying one or more reported aspects associated with one or more source users who are associated with one or more spiritual, political, or social beliefs that are further associated with the end user as depicted in FIG. 4f. For instance, the relevancy factor relevant reported aspect identification module 208 of the computing device 10 identifying the one or more relevant reported aspects 14 including identifying one or more reported aspects 15 associated with one or more source users 2* who are associated with one or more spiritual, political, or social beliefs that are further associated with the end user 4*.

In various implementations, other types of relevancy factors may be considered in identifying the one or more relevant reported aspects 14 other than relevancy factors that relate to common traits of an end user 4* as was the case in operation 424. For example, in some implementations, operation 423 for identifying the one or more relevant reported aspects 14 based on one or more relevancy factors may include an operation 433 for identifying the one or more relevant reported aspects including identifying one or more reported aspects that indicate one or more behavior incidences associated with the one or more source users as depicted in FIG. 4f. For instance, the relevancy factor relevant reported aspect identification module 208 of the computing device 10 identifying the one or more relevant reported aspects 14 including identifying one or more reported aspects 15 that indicate one or more behavior incidences (e.g., exercise or sleep activities) associated with the one or more source users 2*.

Operation 433 may further include, in various implementations, an operation 434 for identifying the one or more relevant reported aspects including identifying one or more reported aspects that indicate one or more incidences of activities executed by the one or more source users as depicted in FIG. 4f. For instance, the relevancy factor relevant reported aspect identification module 208 of the computing device 10 identifying the one or more relevant reported aspects 14 including identifying one or more reported aspects 15 that indicate one or more incidences of activities (e.g., dietary activities, social or employment activities, leisure activities, and so forth) executed by the one or more source users 2*.

In the same or different implementations, operation 433 may include an operation 435 for identifying the one or more relevant reported aspects including identifying one or more reported aspects that indicate one or more user attitudes or conduct associated with the one or more source users as depicted in FIG. 4f. For instance, the relevancy factor relevant reported aspect identification module 208 of the computing device 10 identifying the one or more relevant reported aspects 14 including identifying one or more reported aspects 15 that indicate one or more user attitudes or conduct (e.g., mannerisms, outlook, approach, demeanor, and so forth) associated with the one or more source users 2*.

Figure 4G:
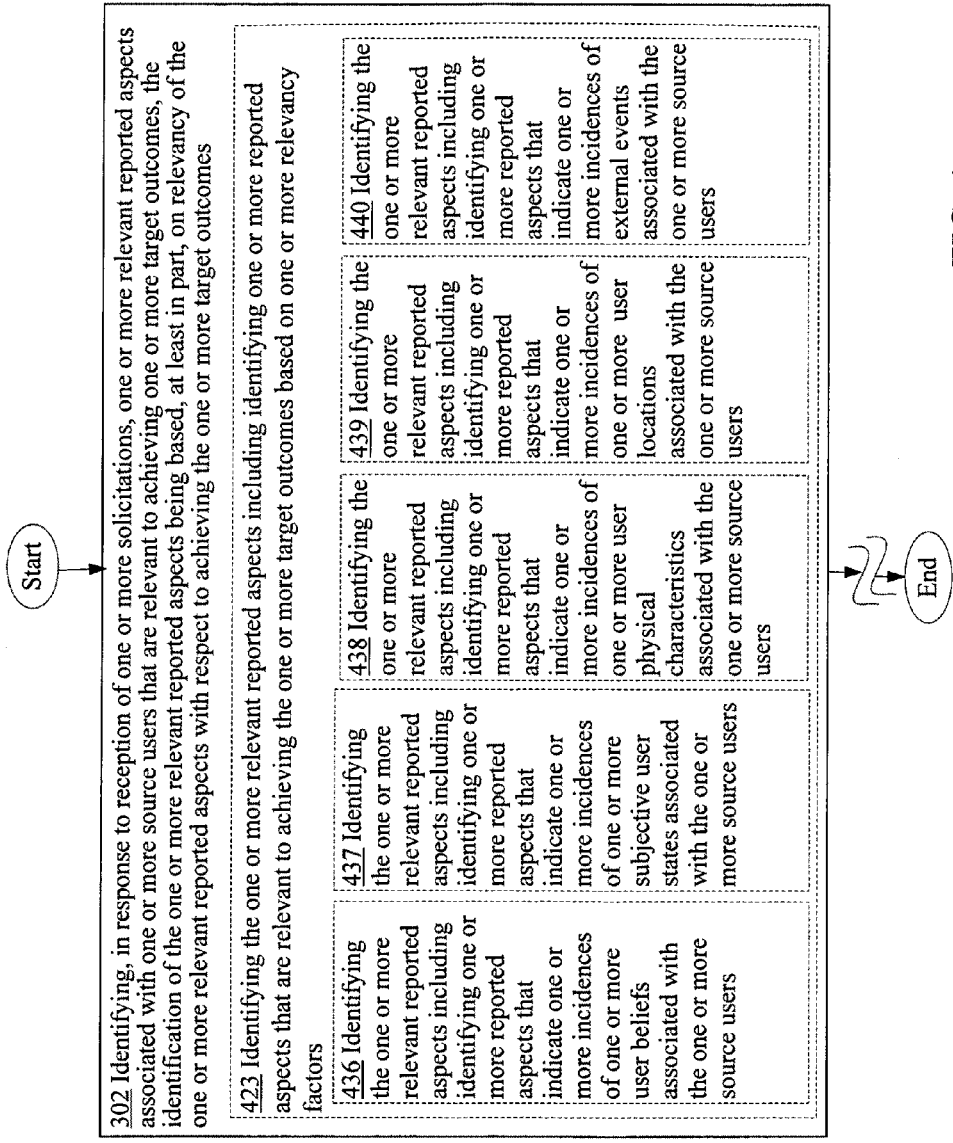
FIG. 4g is a high-level logic flowchart of a process depicting alternate implementations of the relevant reported aspect identifying operation 302 of FIG. 3.

In some implementations, operation 423 may include an operation 436 for identifying the one or more relevant reported aspects including identifying one or more reported aspects that indicate one or more incidences of one or more user beliefs associated with the one or more source users as depicted in FIG. 4g. For instance, the relevancy factor relevant reported aspect identification module 208 of the computing device 10 identifying the one or more relevant reported aspects 14 including identifying one or more reported aspects 15 that indicate one or more incidences of one or more user beliefs (e.g., spiritual or religious beliefs, superstitious beliefs, dietary beliefs, and so forth) associated with the one or more source users 2*.

In the same or different implementations, operation 423 may include an operation 437 for identifying the one or more relevant reported aspects including identifying one or more reported aspects that indicate one or more incidences of one or more subjective user states associated with the one or more source users as depicted in FIG. 4g. For instance, the relevancy factor relevant reported aspect identification module 208 of the computing device 10 identifying the one or more relevant reported aspects 14 including identifying one or more reported aspects 15 that indicate one or more incidences of one or more subjective user states associated with the one or more source users 2*.

A subjective user state may be any state or status associated with a source user 2* that can typically only be indicated by the source user 2*. Examples of subjective user states include, for example, subjective user mental states (e.g., sadness, happiness, mental exhaustion, alertness, and so forth), subjective user physical states (e.g., sore back, blurred vision, overall physical exhaustion, and so forth), and subjective user overall states (e.g., any other subjective user states that are neither a subjective user mental state or a subjective user physical state including, for example, "feeling good," "feeling bad," "feeling alive," and so forth).

In the same or different implementations, operation 423 may include an operation 438 for identifying the one or more relevant reported aspects including identifying one or more reported aspects that indicate one or more incidences of one or more user physical characteristics associated with the one or more source users as depicted in FIG. 4g. For instance, the relevancy factor relevant reported aspect identification module 208 of the computing device 10 identifying the one or more relevant reported aspects 14 including identifying one or more reported aspects 15 that indicate one or more incidences of one or more user physical characteristics (e.g., hair color, skin color, overall physical shape, and so forth) associated with the one or more source users 2*.

In the same or different implementations, operation 423 may include an operation 439 for identifying the one or more relevant reported aspects including identifying one or more reported aspects that indicate one or more incidences of one or more user locations associated with the one or more source users as depicted in FIG. 4g. For instance, the relevancy factor relevant reported aspect identification module 208 of the computing device 10 identifying the one or more relevant reported aspects 14 including identifying one or more reported aspects 15 that indicate one or more incidences of one or more user locations (e.g., workplace, home, school, and so forth) associated with the one or more source users 2*.

In the same or different implementations, operation 423 may include an operation 440 for identifying the one or more relevant reported aspects including identifying one or more reported aspects that indicate one or more incidences of external events associated with the one or more source users as depicted in FIG. 4g. For instance, the relevancy factor relevant reported aspect identification module 208 of the computing device 10 identifying the one or more relevant reported aspects 14 including identifying one or more reported aspects 15 that indicate one or more incidences of external events (e.g., local weather, performance of a stock that is of interest to a source user 2*, and so forth) associated with the one or more source users 2*.

Figure 4H:
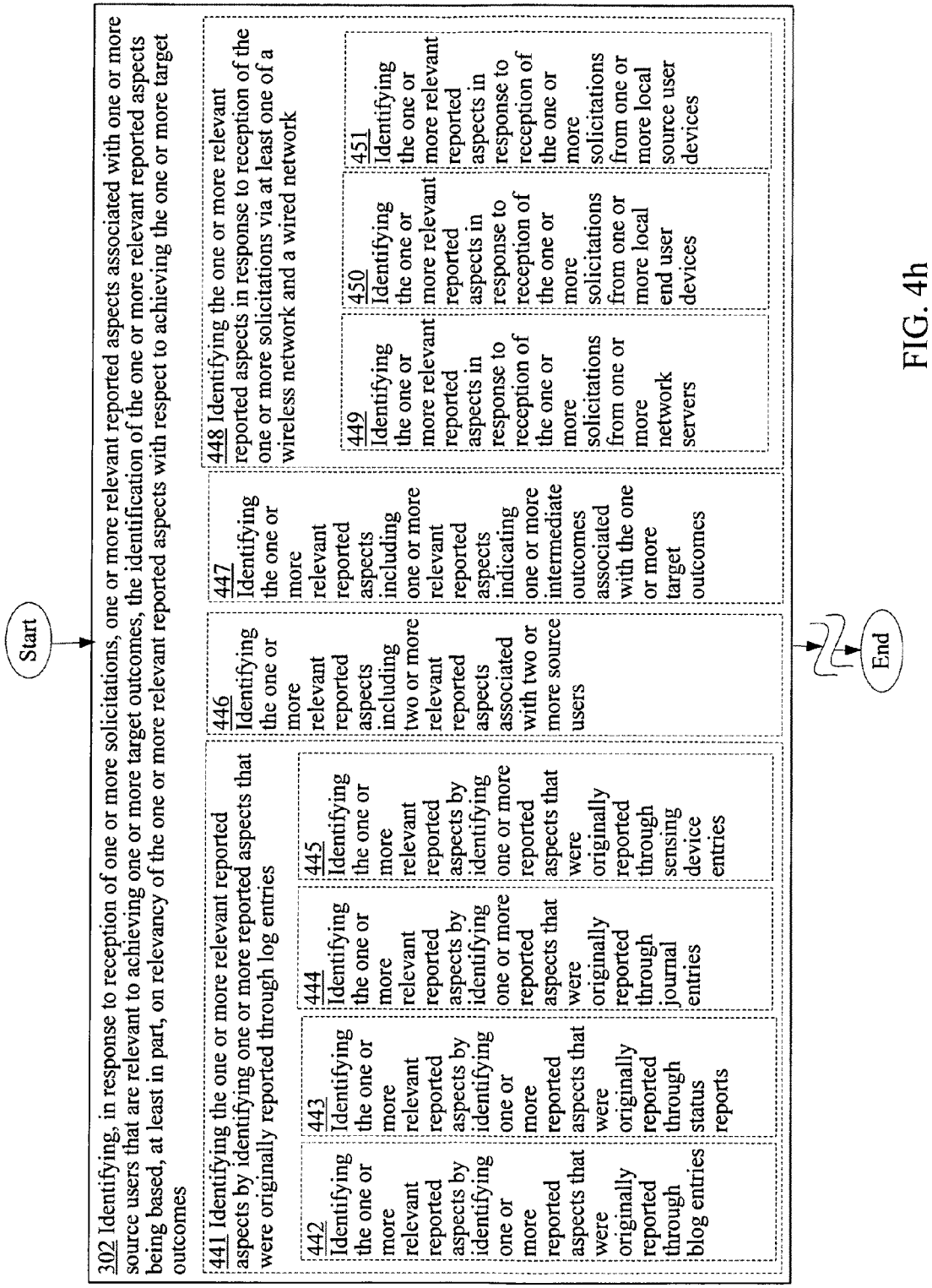
FIG. 4h is a high-level logic flowchart of a process depicting alternate implementations of the relevant reported aspect identifying operation 302 of FIG. 3.

The relevant reported aspects identified through the relevant reported aspect identifying operation 302 of FIG. 3 may have been originally reported through various alternative means. For example, in some implementations, the relevant reported aspect identifying operation 302 may include an operation 441 for identifying the one or more relevant reported aspects by identifying one or more reported aspects that were originally reported through log entries as depicted in FIG. 4h. For instance, the log entry originated relevant reported aspect identification module 212 (see FIG. 2a) of the computing device 10 identifying the one or more relevant reported aspects 14 by identifying one or more reported aspects 15 that were originally reported through log entries (e.g., electronic entries that are continuously, regularly, semi-regularly, or randomly entered).

In various implementations, operation 441 may include one or more additional operations. For example, in some implementations, operation 441 may include an operation 442 identifying the one or more relevant reported aspects by identifying one or more reported aspects that were originally reported through blog entries as depicted in FIG. 4h. For instance, the log entry originated relevant reported aspect identification module 212 of the computing device 10 identifying the one or more relevant reported aspects 14 by identifying one or more reported aspects 15 that were originally reported through blog entries (e.g., microblog entries).

In the same or different implementations, operation 441 may include an operation 443 for identifying the one or more relevant reported aspects by identifying one or more reported aspects that were originally reported through status reports as depicted in FIG. 4h. For instance, the log entry originated relevant reported aspect identification module 212 of the computing device 10 identifying the one or more relevant reported aspects 14 by identifying one or more reported aspects 15 that were originally reported through status reports (e.g., social networking status reports).

In the same or different implementations, operation 441 may include an operation 444 for identifying the one or more relevant reported aspects by identifying one or more reported aspects that were originally reported through journal entries as depicted in FIG. 4h. For instance, the log entry originated relevant reported aspect identification module 212 of the computing device 10 identifying the one or more relevant reported aspects 14 by identifying one or more reported aspects that were originally reported through journal entries (e.g., diary entries).

In the same or different implementations, operation 441 may include an operation 445 for identifying the one or more relevant reported aspects by identifying one or more reported aspects that were originally reported through sensing device entries as depicted in FIG. 4h. For instance, the log entry originated relevant reported aspect identification module 212 of the computing device 10 identifying the one or more relevant reported aspects 14 by identifying one or more reported aspects 14 that were originally reported through sensing device entries (e.g., as provided by one or more sensing devices 40 or by sensors 240).

In various implementations, the relevant reported aspect identifying operation 302 of FIG. 3 may include an operation 446 for identifying the one or more relevant reported aspects including two or more relevant reported aspects associated with two or more source users as depicted in FIG. 4h. For instance, the relevant reported aspect identification module 102 of the computing device 10 identifying the one or more relevant reported aspects 14 including two or more relevant reported aspects 14 associated with two or more source users 2*.

In the same or different implementations, the relevant reported aspect identifying operation 302 may include an operation 447 for identifying the one or more relevant reported aspects including one or more relevant reported aspects indicating one or more intermediate outcomes associated with the one or more target outcomes as depicted in FIG. 4h. For instance, the relevant reported aspect identification module 102 of the computing device 10 identifying the one or more relevant reported aspects 14 including one or more relevant reported aspects 14 indicating one or more intermediate outcomes (e.g., running a mile in 10 minutes) associated with the one or more target outcomes (e.g., running a mile in 7 minutes).

In the same or different implementations, the relevant reported aspect identifying operation 302 may include an operation 448 for identifying the one or more relevant reported aspects in response to reception of the one or more solicitations via at least one of a wireless network and a wired network as depicted in FIG. 4h. For instance, the relevant reported aspect identification module 102 of the computing device 10 identifying the one or more relevant reported aspects 14 in response to reception of the one or more solicitations 13 (e.g., as received by the solicitation reception module 122) via at least one of a wireless network and a wired network 50.

In various implementations, operation 448 may in turn include one or more additional operations. For example, in some implementations, operation 448 may include an operation 449 for identifying the one or more relevant reported aspects in response to reception of the one or more solicitations from one or more network servers as depicted in FIG. 4h. For instance, the relevant reported aspect identification module 102 of the computing device 10 identifying the one or more relevant reported aspects 14 in response to reception of the one or more solicitations 13 from one or more network servers 60.

In the same or different implementations, operation 448 may include an operation 450 for identifying the one or more relevant reported aspects in response to reception of the one or more solicitations from one or more local end user devices as depicted in FIG. 4h. For instance, the relevant reported aspect identification module 102 of the computing device 10 identifying the one or more relevant reported aspects 14 in response to, for example, the solicitation reception module 122 receiving the one or more solicitations 13 from one or more local end user devices 30*.

In the same or different implementations, operation 448 may include an operation 451 for identifying the one or more relevant reported aspects in response to reception of the one or more solicitations from one or more local source user devices as depicted in FIG. 4h. For instance, the relevant reported aspect identification module 102 of the computing device 10 identifying the one or more relevant reported aspects 14 in response to reception of the one or more solicitations 13 from one or more local source user devices 20*.

Figure 5A:
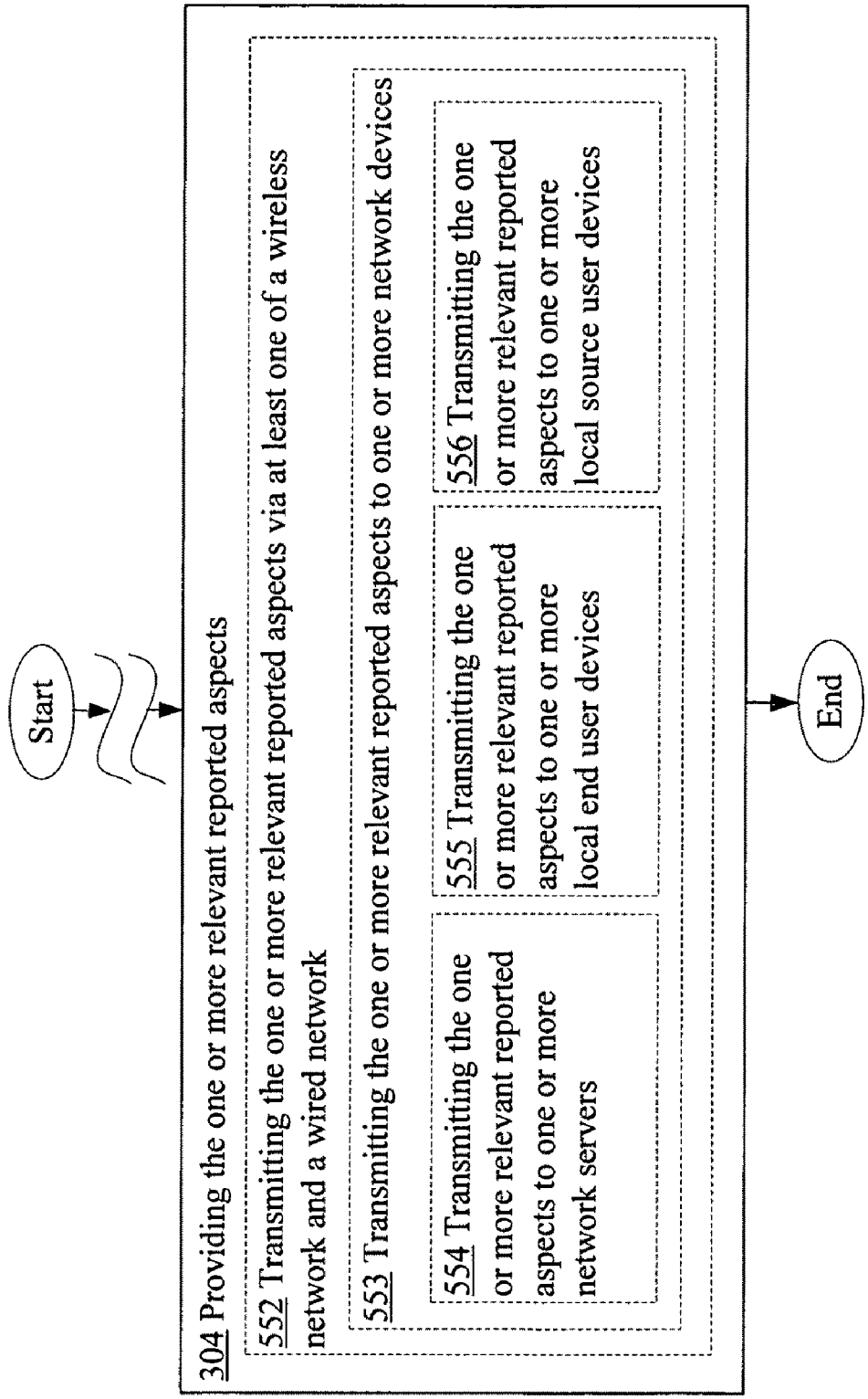
FIG. 5a is a high-level logic flowchart of a process depicting alternate implementations of the relevant reported aspect providing operation 304 of FIG. 3.

Referring back to the relevant reported aspect providing operation 304 of FIG. 3, in various implementations, the relevant reported aspect providing operation 304 may include one or more additional operations. For example, in some implementations, the relevant reported aspect providing operation 304 may include an operation 552 for transmitting the one or more relevant reported aspects via at least one of a wireless network and a wired network as depicted in FIG. 5a. For instance, the network transmission module 220 (see FIG. 2b) of the computing device 10 transmitting the one or more relevant reported aspects 14 via at least one of a wireless network and a wired network 50.

In some implementations, operation 552 may further include an operation 553 for transmitting the one or more relevant reported aspects to one or more network devices as depicted in FIG. 5a. For instance, the network device transmission module 222 (see FIG. 2b) of the computing device 10 transmitting the one or more relevant reported aspects 14 to one or more network devices (e.g., network servers, client devices, and so forth).

Operation 553 may, in turn, include one or more additional operations. For example, in some implementations, operation 553 may include an operation 554 for transmitting the one or more relevant reported aspects to one or more network servers as depicted in FIG. 5a. For instance, the network device transmission module 222 of the computing device 10 transmitting the one or more relevant reported aspects 14 to one or more network servers 60.

In the same or different implementations, operation 553 may include an operation 555 for transmitting the one or more relevant reported aspects to one or more local end user devices as depicted in FIG. 5a. For instance, the network device transmission module 222 of the computing device 10 transmitting the one or more relevant reported aspects 14 to one or more local end user devices 30*.

In the same or different implementations, operation 553 may include an operation 556 for transmitting the one or more relevant reported aspects to one or more local source user devices as depicted in FIG. 5a. For instance, the network device transmission module 222 of the computing device 10 transmitting the one or more relevant reported aspects 14 to one or more local source user devices 20*.

Figure 5B:
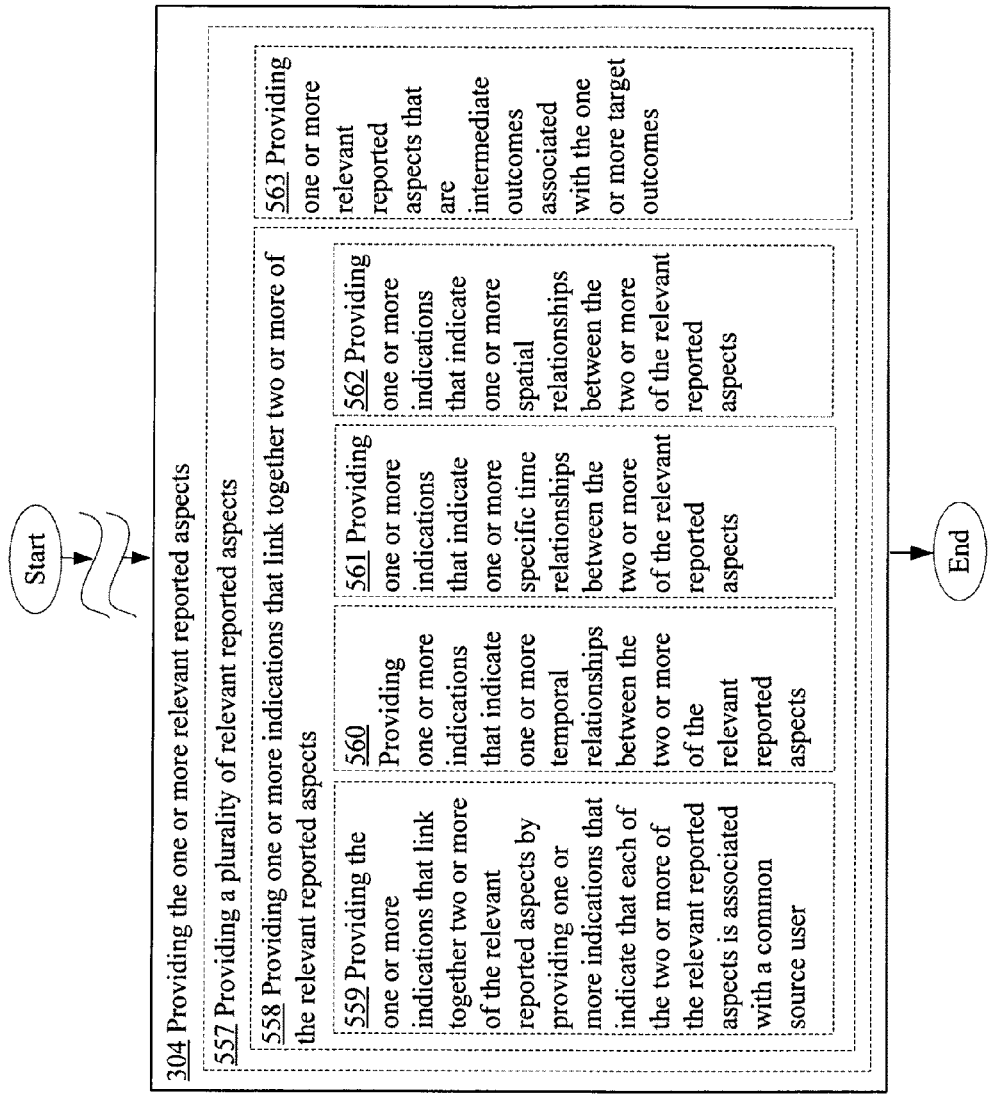
FIG. 5b is a high-level logic flowchart of a process depicting alternate implementations of the relevant reported aspect providing operation 304 of FIG. 3.

In various implementations, the relevant reported aspect providing operation 304 of FIG. 3 may include an operation 557 for providing a plurality of relevant reported aspects as depicted in FIG. 5b. For instance, the relevant reported aspect providing module 104 of the computing device 10 providing a plurality of relevant reported aspects 14 (e.g., providing two or more relevant reported aspects 14 via user interface 120 and/or via network interface 118).

Operation 557 may, in turn, include an operation 558 for providing one or more indications that link together two or more of the relevant reported aspects as depicted in FIG. 5b. For instance, the link indication providing module 224 (see FIG. 2b) of the computing device 10 providing one or more indications that link together two or more of the relevant reported aspects 14. For example, each of the two or more relevant reported aspects 14 may be provided with attributes that indicate that each of the two or more relevant reported aspects 14 are associated with the same source user 2*.

Thus, in some implementations, operation 558 may further include an operation 559 for providing the one or more indications that link together two or more of the relevant reported aspects by providing one or more indications that indicate that each of the two or more of the relevant reported aspects is associated with a common source user as depicted in FIG. 5b.

For instance, the link indication providing module 224 (see FIG. 2b) of the computing device 10 providing the one or more indications that link together two or more of the relevant reported aspects 14 by providing one or more indications that indicate that each of the two or more of the relevant reported aspects 14 is associated with a common source user 2*.

In the same or different implementations, operation 558 may further include an operation 560 for providing one or more indications that indicate one or more temporal relationships between the two or more of the relevant reported aspects as depicted in FIG. 5b. For instance, the relationship indication providing module 226 (see FIG. 2b) of the computing device 10 providing one or more indications that indicate one or more temporal relationships between the two or more of the relevant reported aspects 14.

In the same or different implementations, operation 558 may further include an operation 561 for providing one or more indications that indicate one or more specific time relationships between the two or more of the relevant reported aspects as depicted in FIG. 5b. For instance, the relationship indication providing module 226 of the computing device 10 providing one or more indications that indicate one or more specific time relationships between the two or more of the relevant reported aspects 14.

In the same or different implementations, operation 558 may further include an operation 562 for providing one or more indications that indicate one or more spatial relationships between the two or more of the relevant reported aspects as depicted in FIG. 5b. For instance, the relationship indication providing module 226 of the computing device 10 providing one or more indications that indicate one or more spatial relationships between the two or more of the relevant reported aspects 14.

In various implementations, operation 557 may include an operation 563 for providing one or more relevant reported aspects that are intermediate outcomes associated with the one or more target outcomes as depicted in FIG. 5b. For instance, the relevant reported aspect providing module 104 of the computing device 10 providing one or more relevant reported aspects 14 that are intermediate outcomes associated with the one or more target outcomes.

Figure 6:
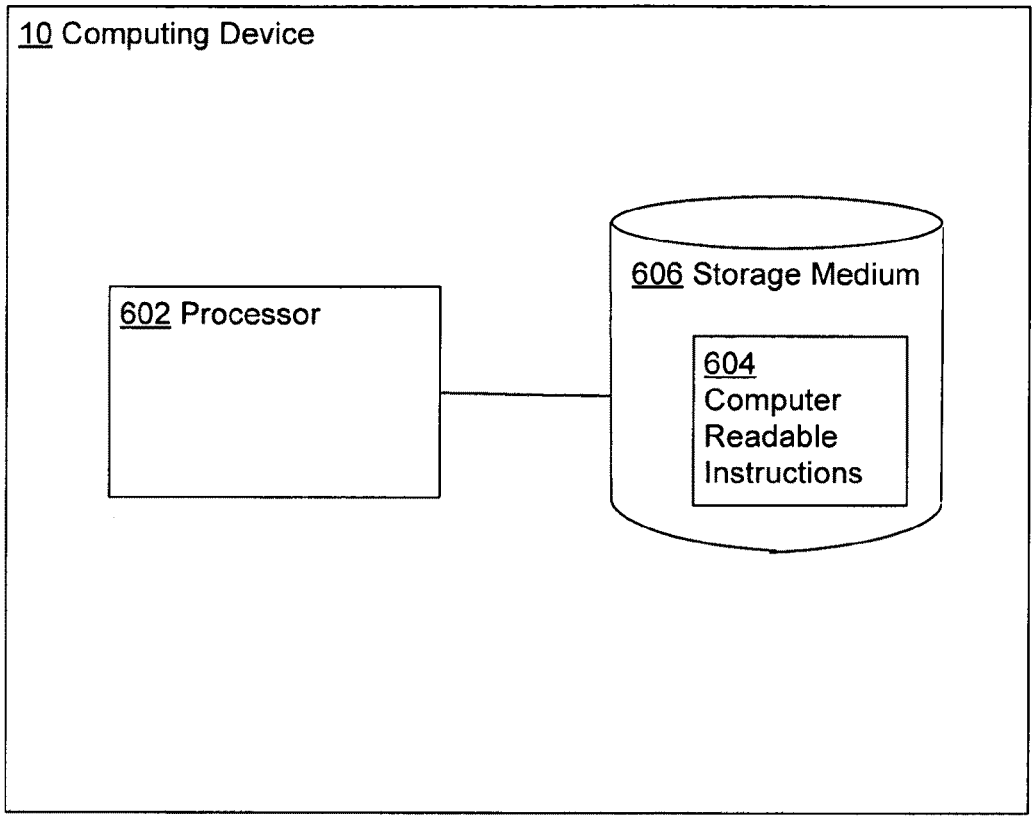
FIG. 6 is another high-level block diagram showing one implementation of the computing device 10 of FIG. 1b.

Turning now to FIG. 6, which is a high-level block diagram illustrating a particular implementation of the computing device 10 of FIG. 1b. As illustrated, the computing device 10 may include a processor 602 (e.g., microprocessor, controller, and so forth) coupled to storage medium 606 (e.g., volatile or non-volatile memory). The storage medium 606 may store computer readable instructions 604 (e.g., computer program product). The processor 602, in various implementations, may execute the computer readable instructions 604 in order to execute one or more operations described above and as illustrated in FIGS. 3, 4a, 4b, 4c, 4d, 4e, 4f, 4g, 4h, 5a, and 5b.

For example, the processor 602 may execute the computer readable instructions 604 in order to identify, in response to reception of one or more solicitations 13, one or more relevant reported aspects 14 associated with one or more source users 2* that are relevant to achieving one or more target outcomes, the identification of the one or more relevant reported aspects 14 being based, at least in part, on relevancy of the one or more relevant reported aspects 14 with respect to the one or more target outcomes; and/or to provide the one or more relevant reported aspects 14 as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system for developing one or more personalized plans to achieve one or more target outcomes, comprising:

(A) one or more processors;
(B) means for identifying, in response to reception of one or more solicitations, one or more relevant reported aspects associated with one or more source users who are members of one or more social networking groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to achieving the one or more target outcomes, wherein said means for identifying, in response to reception of one or more solicitations, one or more relevant reported aspects associated with one or more source users who are members of one or more social network groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to achieving the one or more target outcomes, comprises:
  (1) means for identifying the one or more relevant reported aspects by at least identifying one or more reported aspects that are associated with the one or more source users, the one or more source users having achieved the one or more target outcomes, wherein said means for identifying the one or more relevant reported aspects by at least identifying one or more reported aspects that are associated with the one or more source users, the one or more source users having achieved the one or more target outcomes, comprises:
    (i) means for identifying the one or more relevant reported aspects by at least identifying one or more reported aspects that correspond to the one or more target outcomes;
    (ii) means for determining one or more source users who are associated with the one or more reported aspects that were identified as being corresponding to the one or more target outcomes; and
    (iii) means for identifying one or more reported aspects that are associated with the one or more source users determined to be associated with the one or more reported aspects that correspond to the one or more target outcomes, the identification of the one or more reported aspects that are associated with the one or more source users being based on the determination of the one or more source users being associated with the one or more reported aspects that correspond to the one or more target outcomes, wherein said means for identifying one or more reported aspects that are associated with the one or more source users determined to be associated with the one or more reported aspects that correspond to the one or more target outcomes;
  (2) means for identifying, from the one or more reported aspects that are associated with the one or more source users determined to be associated with the one or more reported aspects that correspond to the one or more target outcomes, one or more reported aspects that are relevant with respect to one or more relevancy factors, wherein said means for identifying, from the one or more reported aspects that are associated with the one or more source users determined to be associated with the one or more reported aspects that correspond to the one or more target outcomes, one or more reported aspects that are relevant with respect to one or more relevancy factors, comprises:
    (i) means for identifying the one or more reported aspects that are relevant with respect to one or more relevancy factors by identifying one or more reported aspects that indicate one or more aspects that occurred within one or more predefined time increments, respectively, from one or more occurrences of the one or more reported aspects that correspond to the one or more target outcomes; and
(C) means for providing the one or more relevant reported aspects, wherein said means for providing the one or more relevant reported aspects, comprises:
  (1) means for providing a plurality of relevant reported aspects, wherein said means for providing a plurality of relevant reported aspects, comprises:
    (i) means for providing one or more indications that link together two or more of the relevant reported aspects, wherein said means for providing one or more indications that link together two or more of the relevant reported aspects, comprises:
      (a) means for providing one or more indications that indicate one or more temporal relationships between the two or more of the relevant reported aspects.

2. A computationally-implemented system for developing one or more personalized plans to achieve one or more target outcomes, comprising:
(A) one or more processors;
(B) means for identifying, in response to reception of one or more solicitations, one or more relevant reported aspects associated with one or more source users who are members of one or more social networking groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to achieving the one or more target outcomes, wherein said means for identifying, in response to reception of one or more solicitations, one or more relevant reported aspects associated with one or more source users who are members of one or more social network groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to achieving the one or more target outcomes, comprises:
  (1) means for identifying the one or more relevant reported aspects by at least identifying one or more reported aspects that are associated with the one or more source users, the one or more source users having achieved the one or more target outcomes, wherein said means for identifying the one or more relevant reported aspects by at least identifying one or more reported aspects that are associated with the one or more source users, the one or more source users having achieved the one or more target outcomes, comprises:

(i) means for identifying the one or more relevant reported aspects by at least identifying one or more reported aspects that correspond to the one or more target outcomes;

(ii) means for determining one or more source users who are associated with the one or more reported aspects that were identified as being corresponding to the one or more target outcomes; and (iii) means for identifying one or more reported aspects that are associated with the one or more source users determined to be associated with the one or more reported aspects that correspond to the one or more target outcomes, the identification of the one or more reported aspects that are associated with the one or more source users being based on the determination of the one or more source users being associated with the one or more reported aspects that correspond to the one or more target outcomes;

(2) means for identifying, from the one or more reported aspects that are associated with the one or more source users determined to be associated with the one or more reported aspects that correspond to the one or more target outcomes, one or more reported aspects that are relevant with respect to one or more relevancy factors, wherein said means for identifying, from the one or more reported aspects that are associated with the one or more source users determined to be associated with the one or more reported aspects that correspond to the one or more target outcomes, one or more reported aspects that are relevant with respect to one or more relevancy factors, comprises:

(i) means for identifying the one or more reported aspects that are relevant with respect to one or more relevancy factors by identifying one or more reported aspects that indicate one or more aspects that occurred within one or more predefined time increments, respectively, from one or more occurrences of the one or more reported aspects that correspond to the one or more target outcomes; and (C) means for providing the one or more relevant reported aspects, wherein said means for providing the one or more relevant reported aspects, comprises:

(1) means for providing a plurality of relevant reported aspects, wherein said means for providing a plurality of relevant reported aspects, comprises:

(i) means for providing one or more indications that link together two or more of the relevant reported aspects, wherein said means for providing one or more indications that link together two or more of the relevant reported aspects, comprises:

(a) means for providing one or more indications that indicate one or more temporal relationships between the two or more of the relevant reported aspects.

3. A computationally-implemented system for developing one or more personalized plans to achieve one or more target outcomes, comprising:

(A) one or more processors;

(B) means for identifying, in response to reception of one or more solicitations, one or more relevant reported aspects associated with one or more source users who are members of one or more social networking groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to achieving the one or more target outcomes, wherein said means for identifying, in response to reception of one or more solicitations, one or more relevant reported aspects associated with one or more source users who are members of one or more social network groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to achieving the one or more target outcomes, comprises:

(1) means for identifying the one or more relevant reported aspects by at least identifying one or more reported aspects that are associated with the one or more source users, the one or more source users having achieved the one or more target outcomes, wherein said means for identifying the one or more relevant reported aspects by at least identifying one or more reported aspects that are associated with the one or more source users, the one or more source users having achieved the one or more target outcomes, comprises:

(i) means for identifying the one or more relevant reported aspects by at least identifying one or more reported aspects that correspond to the one or more target outcomes;

(ii) means for determining one or more source users who are associated with the one or more reported aspects that were identified as being corresponding to the one or more target outcomes; and (iii) means for identifying one or more reported aspects that are associated with the one or more source users determined to be associated with the one or more reported aspects that correspond to the one or more target outcomes, the identification of the one or more reported aspects that are associated with the one or more source users being based on the determination of the one or more source users being associated with the one or more reported aspects that correspond to the one or more target outcomes;

(2) means for identifying, from the one or more reported aspects that are associated with the one or more source users determined to be associated with the one or more reported aspects that correspond to the one or more target outcomes, one or more reported aspects that are relevant with respect to one or more relevancy factors, wherein said means for identifying, from the one or more reported aspects that are associated with the one or more source users determined to be associated with the one or more reported aspects that correspond to the one or more target outcomes, one or more reported aspects that are relevant with respect to one or more relevancy factors, comprises:

(i) means for identifying the one or more reported aspects that are relevant with respect to one or more relevancy factors by identifying one or more reported aspects that indicate one or more aspects that occurred within one or more predefined time increments, respectively, from one or more occurrences of the one or more reported aspects that correspond to the one or more target outcomes; and (C) means for providing the one or more relevant reported aspects, wherein said means for providing the one or more relevant reported aspects, comprises:
  (1) means for providing a plurality of relevant reported aspects, wherein said means for providing a plurality of relevant reported aspects, comprises:
    (i) means for providing one or more indications that link together two or more of the relevant reported aspects, wherein said means for providing one or more indications that link together two or more of the relevant reported aspects, comprises:
      (a) means for providing one or more indications that indicate one or more temporal relationships between the two or more of the relevant reported aspects.

4. The computationally-implemented system of claim 3, wherein said means for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes, comprises:
  means for identifying the one or more relevant reported aspects in response to reception of one or more solicitations that indicate the one or more source users, the one or more source users having achieved the one or more target outcomes.

5. The computationally-implemented system of claim 3, wherein said means for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes, comprises:
  means for identifying the one or more relevant reported aspects in response to reception of one or more solicitations that indicate the one or more target outcomes.

6. The computationally-implemented system of claim 5, wherein said means for identifying the one or more relevant reported aspects in response to reception of one or more solicitations that indicate the one or more target outcomes, comprises:
  means for identifying the one or more relevant reported aspects in response to reception of one or more solicitations that indicate the one or more target outcomes and that indicate one or more relevancy factors.

7. The computationally-implemented system of claim 6, wherein said means for identifying the one or more relevant reported aspects in response to reception of one or more solicitations that indicate the one or more target outcomes and that indicate one or more relevancy factors, comprises:
  means for identifying the one or more relevant reported aspects in response to reception of one or more solicitations that indicate the one or more target outcomes and that indicate one or more aspect types that are of interest to one or more end users, the one or more end users being beneficiaries of the providing of the one or more relevant reported aspects.

8. The computationally-implemented system of claim 6, wherein said means for identifying the one or more relevant reported aspects in response to reception of one or more solicitations that indicate the one or more target outcomes and that indicate one or more relevancy factors, comprises:
  means for identifying the one or more relevant reported aspects in response to reception of one or more solicitations that indicate the one or more target outcomes and that indicate one or more aspect types indicated by at least one source user as being relevant to the achievement of the one or more target outcomes.

9. The computationally-implemented system of claim 6, wherein said means for identifying the one or more relevant reported aspects in response to reception of one or more solicitations that indicate the one or more target outcomes and that indicate one or more relevancy factors, comprises:
  means for identifying the one or more relevant reported aspects in response to reception of one or more solicitations that indicate the one or more target outcomes and that indicate one or more predefined time increments, the one or more predefined time increments to be considered in order to determine relevancy of one or more reported aspects with respect to achieving the one or more target outcomes.

10. The computationally-implemented system of claim 3, wherein said means for identifying, from the one or more reported aspects that are associated with the one or more source users determined to be associated with the one or more reported aspects that correspond to the one or more target outcomes, one or more reported aspects that are relevant with respect to one or more relevancy factors, comprises:
  means for identifying the one or more reported aspects that are relevant with respect to one or more relevancy factors by identifying one or more reported aspects that belong to one or more aspect types that are of interest to an end user, the end user being a beneficiary of the one or more relevant reported aspects to be provided.

11. The computationally-implemented system of claim 3, wherein said means for identifying the one or more relevant reported aspects including identifying one or more reported aspects that are relevant to achieving the one or more target outcomes based on one or more relevancy factors, comprises:
  means for identifying the one or more relevant reported aspects including identifying one or more reported aspects associated with one or more source users who share one or more common traits with an end user, the end user being a beneficiary of the one or more relevant reported aspects to be provided.

12. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
  means for identifying the one or more relevant reported aspects including identifying one or more reported aspects associated with one or more source users who are members of one or more social networking groups that are associated with the end user.

13. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
  means for identifying the one or more relevant reported aspects including identifying one or more reported aspects associated with one or more source users who are members of one or more ethnic or religious groups that are associated with the end user.

14. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
 means for identifying the one or more relevant reported aspects including identifying one or more reported aspects associated with one or more source users who are members of at least one of a gender or an age group that is associated with the end user.

15. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
 means for identifying the one or more relevant reported aspects including identifying one or more reported aspects associated with one or more source users who have one or more physical or mental handicaps that are associated with the end user.

16. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
 means for identifying the one or more relevant reported aspects including identifying one or more reported aspects associated with one or more source users who are associated with one or more health or medical states that are further associated with the end user.

17. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
 means for identifying the one or more relevant reported aspects including identifying one or more reported aspects associated with one or more source users who are associated with one or more intellectual or academic states that are further associated with the end user.

18. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
 means for identifying the one or more relevant reported aspects including identifying one or more reported aspects associated with one or more source users who are associated with one or more social states that are further associated with the end user.

19. The computationally-implemented system of claim 11, wherein said means for identifying the one or more relevant reported aspects including identifying one or more reported aspects associated with one or more source users who share one or more common traits with an end user, the end user being a beneficiary of the one or more relevant reported aspects to be provided, comprises:
 means for identifying the one or more relevant reported aspects including identifying one or more reported aspects associated with one or more source users who are associated with one or more spiritual, political, or social beliefs that are further associated with the end user.

20. The computationally-implemented system of claim 3, wherein said means for identifying the one or more relevant reported aspects including identifying one or more reported aspects that are relevant to achieving the one or more target outcomes based on one or more relevancy factors, comprises:
 means for identifying the one or more relevant reported aspects including identifying one or more reported aspects that indicate one or more behavior incidences associated with the one or more source users.

21. The computationally-implemented system of claim 20, wherein said means for identifying the one or more relevant reported aspects including identifying one or more reported aspects that indicate one or more behavior incidences associated with the one or more source users, comprises:
 means for identifying the one or more relevant reported aspects including identifying one or more reported aspects that indicate one or more incidences of activities executed by the one or more source users.

22. The computationally-implemented system of claim 20, wherein said means for identifying the one or more relevant reported aspects including identifying one or more reported aspects that indicate one or more behavior incidences associated with the one or more source users, comprises:
 means for identifying the one or more relevant reported aspects including identifying one or more reported aspects that indicate one or more user attitudes or conduct associated with the one or more source users.

23. The computationally-implemented system of claim 3, wherein said means for identifying the one or more relevant reported aspects including identifying one or more reported aspects that are relevant to achieving the one or more target outcomes based on one or more relevancy factors, comprises:
 means for identifying the one or more relevant reported aspects including identifying one or more reported aspects that indicate one or more incidences of one or more user beliefs associated with the one or more source users.

24. The computationally-implemented system of claim 3, wherein said means for identifying the one or more relevant reported aspects including identifying one or more reported aspects that are relevant to achieving the one or more target outcomes based on one or more relevancy factors, comprises:
 means for identifying the one or more relevant reported aspects including identifying one or more reported aspects that indicate one or more incidences of one or more subjective user states associated with the one or more source users.

25. The computationally-implemented system of claim 3, wherein said means for identifying the one or more relevant reported aspects including identifying one or more reported aspects that are relevant to achieving the one or more target outcomes based on one or more relevancy factors, comprises:
 means for identifying the one or more relevant reported aspects including identifying one or more reported aspects that indicate one or more incidences of one or more user physical characteristics associated with the one or more source users.

26. The computationally-implemented system of claim 3, wherein said means for identifying the one or more relevant reported aspects including identifying one or more reported aspects that are relevant to achieving the one or more target outcomes based on one or more relevancy factors, comprises:
- means for identifying the one or more relevant reported aspects including identifying one or more reported aspects that indicate one or more incidences of one or more user locations associated with the one or more source users.

27. The computationally-implemented system of claim 3, wherein said means for identifying the one or more relevant reported aspects including identifying one or more reported aspects that are relevant to achieving the one or more target outcomes based on one or more relevancy factors, comprises:
- means for identifying the one or more relevant reported aspects including identifying one or more reported aspects that indicate one or more incidences of one or more external events associated with the one or more source users.

28. The computationally-implemented system of claim 3, wherein said means for identifying, in response to reception of one or more solicitations, one or more relevant reported aspects associated with one or more source users that are relevant to achieving one or more target outcomes, the identification of the one or more relevant reported aspects being based, at least in part, on relevancy of the one or more relevant reported aspects with respect to achieving the one or more target outcomes, comprises:
- means for identifying the one or more relevant reported aspects including two or more relevant reported aspects associated with two or more source users.

29. The computationally-implemented system of claim 3, wherein said means for providing the one or more relevant reported aspects, comprises:
- means for transmitting the one or more relevant reported aspects via at least one of a wireless network or a wired network.

30. The computationally-implemented system of claim 3, wherein said means for providing one or more indications that link together two or more of the relevant reported aspects, comprises:
- means for providing the one or more indications that link together two or more of the relevant reported aspects by providing one or more indications that indicate that each of the two or more of the relevant reported aspects is associated with a common source user.

31. The computationally-implemented system of claim 3, wherein said means for providing one or more indications that link together two or more of the relevant reported aspects, comprises:
- means for providing one or more indications that indicate one or more specific time relationships between the two or more of the relevant reported aspects.

32. A method for developing one or more personalized plans to achieve one or more target outcomes, comprising:
  (A) identifying, using a processor, in response to reception of one or more solicitations, one or more relevant reported aspects associated with one or more source users who are members of one or more social networking groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to the one or more target outcomes, wherein said identifying, using a processor, in response to reception of one or more solicitations, one or more relevant reported aspects associated with one or more source users who are members of one or more social networking groups, the one or more relevant reported aspects being relevant to achieving one or more target outcomes, the identification of the one or more relevant reported aspects being based, at least in part, on relevancy of the one or more relevant reported aspects that were originally reported through one or more blog entries, microblog entries, and/or social network status reports with respect to the one or more target outcomes:
  (1) means for identifying the one or more relevant reported aspects by at least identifying one or more reported aspects that are associated with the one or more source users, the one or more source users having achieved the one or more target outcomes, wherein said means for identifying the one or more relevant reported aspects by at least identifying one or more reported aspects that are associated with the one or more source users, the one or more source users having achieved the one or more target outcomes, comprises:
    (i) means for identifying the one or more relevant reported aspects by at least identifying one or more reported aspects that correspond to the one or more target outcomes;
    (ii) means for determining one or more source users who are associated with the one or more reported aspects that were identified as being corresponding to the one or more target outcomes; and
    (iii) means for identifying one or more reported aspects that are associated with the one or more source users determined to be associated with the one or more reported aspects that correspond to the one or more target outcomes, the identification of the one or more reported aspects that are associated with the one or more source users being based on the determination of the one or more source users being associated with the one or more reported aspects that correspond to the one or more target outcomes;
  (2) means for identifying, from the one or more reported aspects that are associated with the one or more source users determined to be associated with the one or more reported aspects that correspond to the one or more target outcomes, one or more reported aspects that are relevant with respect to one or more relevancy factors, wherein said means for identifying, from the one or more reported aspects that are associated with the one or more source users determined to be associated with the one or more reported aspects that correspond to the one or more target outcomes, one or more reported aspects that are relevant with respect to one or more relevancy factors, comprises:
    (i) means for identifying the one or more reported aspects that are relevant with respect to one or more relevancy factors by identifying one or more reported aspects that indicate one or more aspects that occurred within one or more predefined time increments, respectively, from one or more occurrences of the one or more reported aspects that correspond to the one or more target outcomes; and
  (B) providing the one or more relevant reported aspects, wherein said providing the one or more relevant reported aspects, comprises:
    (1) providing a plurality of relevant reported aspects, wherein said providing a plurality of relevant reported aspects, comprises:

(i) providing one or more indications that link together two or more of the relevant reported aspects, wherein said providing one or more indications that link together two or more of the relevant reported aspects, comprises:

(a) providing one or more indications that indicate one or more temporal relationships between the two or more of the relevant reported aspects.

* * * * *

UNITED STATES PATENT AND TRADEMARK OFFICE
CERTIFICATE OF CORRECTION

PATENT NO. : 8,260,807 B2  
APPLICATION NO. : 12/592544  
DATED : September 4, 2012  
INVENTOR(S) : Firminger et al.

Page 1 of 1

It is certified that error appears in the above-identified patent and that said Letters Patent is hereby corrected as shown below:

In Col. 33, Line 55 cancel text beginning with ", wherein said means for identifying" to and ending "one or more target outcomes" in Col. 33, Line 59.

In Col. 34, Line 9 cancel text beginning with "indicate one or more aspects" to and ending "correspond to the one or more target outcomes" in Col. 34, Line 13 and insert the following text:
--belong to one or more aspect types that have been indicated by at least one source user as being relevant to the achievement of the one or more target outcomes--

In Col. 35, Line 36 cancel text beginning with "indicate one or more aspects" to and ending "correspond to the one or more target outcomes" in Col. 35, Line 40 and insert the following text:
--belong to one or more aspect types that have been indicated by at least one third party source as being relevant to the achievement of the one or more target outcomes--

Signed and Sealed this  
Eleventh Day of December, 2012

David J. Kappos  
*Director of the United States Patent and Trademark Office*